(12) United States Patent
Tokunaga et al.

(10) Patent No.: US 10,609,024 B2
(45) Date of Patent: Mar. 31, 2020

(54) INFORMATION PROCESSING DEVICE, LOGIN CONTROL METHOD AND PROGRAM

(71) Applicant: Sony Interactive Entertainment Inc., Tokyo (JP)

(72) Inventors: Nodoka Tokunaga, Tokyo (JP); Masaki Takase, Tokyo (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 326 days.

(21) Appl. No.: 15/288,353

(22) Filed: Oct. 7, 2016

(65) Prior Publication Data
US 2017/0134377 A1 May 11, 2017

(30) Foreign Application Priority Data
Nov. 5, 2015 (JP) .................................. 2015-217876

(51) Int. Cl.
*G06F 7/04* (2006.01)
*G06F 15/16* (2006.01)
(Continued)

(52) U.S. Cl.
CPC ........ *H04L 63/0861* (2013.01); *A63F 13/213* (2014.09); *A63F 13/655* (2014.09);
(Continued)

(58) Field of Classification Search
CPC .............. H04L 63/0861; H04L 63/083; G06K 9/00228; G06K 9/00255; G06K 9/00288; A63F 2300/695; G06F 3/167
See application file for complete search history.

(56) References Cited

U.S. PATENT DOCUMENTS 10,031,999 B2 * 7/2018 Tamura ................. G16B 99/00
2002/0111917 A1 * 8/2002 Hoffman ................. G06F 21/32
705/64

(Continued)

FOREIGN PATENT DOCUMENTS

JP 2005-035294 A 2/2005
JP 2011-093121 A 5/2011
(Continued)

OTHER PUBLICATIONS

Japanese Office Action dated Sep. 19, 2017 for the Corresponding Japanese Patent Application No. 2015-217876.
(Continued)

*Primary Examiner* — John B King
*Assistant Examiner* — Darshan I Dhruv
(74) *Attorney, Agent, or Firm* — Katten Muchin Rosenman LLP

(57) ABSTRACT

An information processing device includes an imaged image display section configured to display an imaged image on a display, a registered user information retaining section configured to retain face identifying data of a registered user, a face authenticating section configured to detect a face image of the registered user present in the imaged image using the face identifying data retained in the registered user information retaining section, a region image display section configured to display, to the detected registered user, a region image specifying a region to which to move an object on the display, and a guidance control section configured to provide guiding assistance for facilitating the detected registered user moving the object to the region specified by the region image.

5 Claims, 12 Drawing Sheets

(51) Int. Cl.
*G06F 17/30* (2006.01)
*H04L 29/06* (2006.01)
*G06K 9/00* (2006.01)
*A63F 13/213* (2014.01)
*G06F 21/32* (2013.01)
*A63F 13/655* (2014.01)
*A63F 13/73* (2014.01)
*A63F 13/79* (2014.01)
*G06F 3/0484* (2013.01)
*G06F 3/16* (2006.01)

(52) U.S. Cl.
CPC .............. *A63F 13/73* (2014.09); *A63F 13/79* (2014.09); *G06F 21/32* (2013.01); *G06K 9/00228* (2013.01); *G06K 9/00255* (2013.01); *G06K 9/00288* (2013.01); *A63F 2300/695* (2013.01); *G06F 3/04845* (2013.01); *G06F 3/167* (2013.01); *H04L 63/083* (2013.01)

(56) References Cited

U.S. PATENT DOCUMENTS

| | | | | |
|---|---|---|---|---|
| 2006/0044585 | A1* | 3/2006 | Kaneko | G06F 3/1205 358/1.13 |
| 2006/0116884 | A1* | 6/2006 | Itaki | G10L 13/00 704/271 |
| 2006/0184800 | A1 | 8/2006 | Rosenberg | |
| 2008/0107309 | A1* | 5/2008 | Cerni | G06K 9/00033 382/115 |
| 2009/0178126 | A1 | 7/2009 | Du et al. | |
| 2009/0220128 | A1* | 9/2009 | Irimoto | G06K 9/00255 382/118 |
| 2009/0327433 | A1* | 12/2009 | Comertoglu | G06Q 10/107 709/206 |
| 2011/0051911 | A1* | 3/2011 | Agarwal | H04L 12/66 379/93.01 |
| 2011/0154444 | A1* | 6/2011 | Sriraghavan | G06F 3/04883 726/4 |
| 2011/0173204 | A1* | 7/2011 | Murillo | G06F 3/017 707/741 |
| 2012/0101632 | A1* | 4/2012 | Ha | B25J 9/162 700/248 |
| 2013/0169839 | A1* | 7/2013 | Takahashi | H04N 5/76 348/231.99 |
| 2014/0240363 | A1* | 8/2014 | Hong | G06F 3/012 345/684 |
| 2015/0135308 | A1* | 5/2015 | Smith | G06F 21/32 726/19 |
| 2016/0012248 | A1* | 1/2016 | Inoue | G06F 21/6245 726/4 |
| 2016/0063235 | A1* | 3/2016 | Tussy | G06F 21/32 726/6 |
| 2016/0335483 | A1* | 11/2016 | Pfursich | G06K 9/00899 |
| 2017/0085568 | A1* | 3/2017 | Rolfe | H04L 63/0861 |

FOREIGN PATENT DOCUMENTS

| | | |
|---|---|---|
| JP | 2012-212071 A | 11/2012 |
| JP | 2014-092943 A | 5/2014 |
| JP | 2015-90661 | 5/2015 |

OTHER PUBLICATIONS

Japanese Office Action dated Dec. 5, 2017 for the Corresponding Japanese Patent Application No. 2015-217876.

* cited by examiner

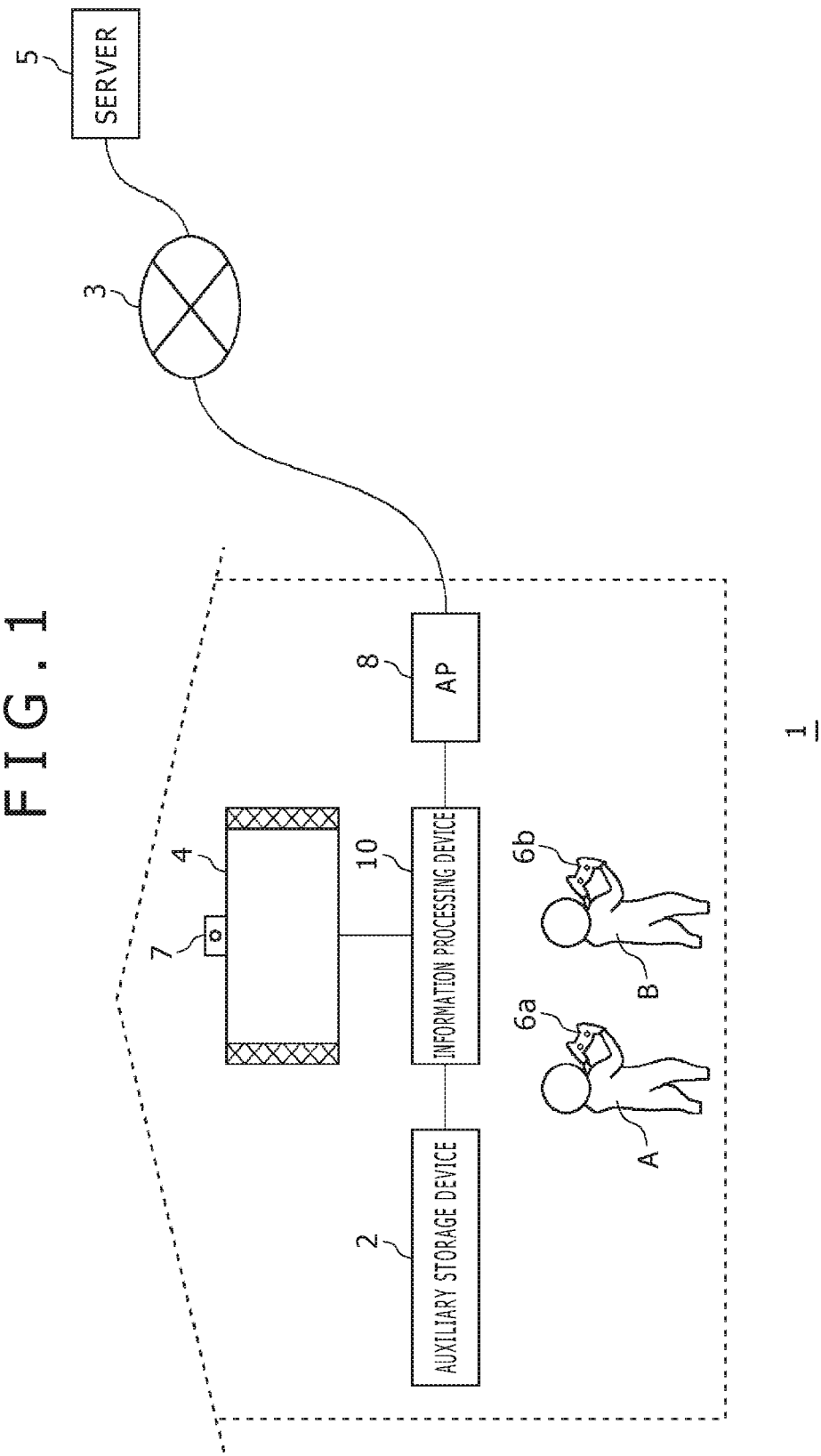

4

4

INFORMATION PROCESSING DEVICE, LOGIN CONTROL METHOD AND PROGRAM

BACKGROUND

The present technology relates to an information processing technology for assisting a user in login operation.

Japanese Patent Laid-Open No. 2015-90661 (hereinafter referred to as Patent Document 1) discloses a plurality of pieces of processing that log in a user. One piece of login processing disclosed in Patent Document 1 performs user authentication in a first stage by performing face authentication using a camera image, performs user authentication in a second stage when the user moves the face to a specified region within display, and then logs in the user. Another piece of login processing performs user authentication in a first stage by performing face authentication using a camera image, performs user authentication in a second stage when the user moves an input device to a specified region within display, and then logs in the user.

SUMMARY

In the two pieces of login processing disclosed in Patent Document 1, the user authentication in the first stage is performed automatically without the user being aware of the user authentication in the first stage. When it is determined by the user authentication in the first stage that an imaged person is a registered user, a user name is displayed in the vicinity of the face of the user. After the user confirms that the user is correctly recognized, the user moves the face or the input device to the specified region displayed on the display so that the user authentication in the second stage is performed.

Recently, attention has been directed to technology related to improvements in "user accessibility" by providing accessible service to many users. When consideration is given to a situation in which users log in, constructing a mechanism that enables all of the users to log in smoothly realizes an improvement in user accessibility.

It is accordingly desirable to provide a technology for assisting a user in login operation.

According to a mode of the present technology, there is provided an information processing device including an imaged image display section configured to display an imaged image on a display, a registered user information retaining section configured to retain face identifying data of a registered user, a face authenticating section configured to detect a face image of the registered user present in the imaged image using the face identifying data retained in the registered user information retaining section, and a region image display section configured to display, to the detected registered user, a region image specifying a region to which to move an object on the display. The information processing device in this mode further includes a guidance control section configured to provide guiding assistance for facilitating the detected registered user moving the object to the region specified by the region image.

Another mode of the present technology is a login control method. This method includes displaying an imaged image on a display, detecting a face image of a registered user present in the imaged image using face identifying data of the registered user, the face identifying data being retained in a registered user information retaining section, displaying, to the detected registered user, a region image specifying a region to which to move an object on the display, authenticating the object moved to the region image, and logging in the registered user. This login control method further includes providing guiding assistance for facilitating the detected registered user moving the object to the region specified by the region image.

Still another mode of the present technology is a program for a computer. The program includes by an imaged image display section, displaying an imaged image on a display, by a face authenticating section, detecting a face image of a registered user present in the imaged image using face identifying data of the registered user, the face identifying data being retained in a registered user information retaining section, and by a region image display section, displaying, to the detected registered user, a region image specifying a region to which to move an object on the display. This program further includes by a guidance control section, providing guiding assistance for facilitating the detected registered user moving the object to the region specified by the region image, by an object authenticating section, authenticating the object moved to the region image, and by a login processing section, logging in the registered user.

It is to be noted that arbitrary combinations of the above constituent elements as well as modes obtained by converting expressions of the present technology between a method, a device, a system, a recording medium, a computer program, and the like are also effective as modes of the present technology.

An information processing technology according to an embodiment of the present technology can provide a technology for allowing a user to perform login operation suitably.

BRIEF DESCRIPTION OF THE DRAWINGS

FIG. 1 is a diagram depicting an information processing system according to an embodiment of the present technology;

DETAILED DESCRIPTION OF THE PREFERRED EMBODIMENT

Figure 2A:
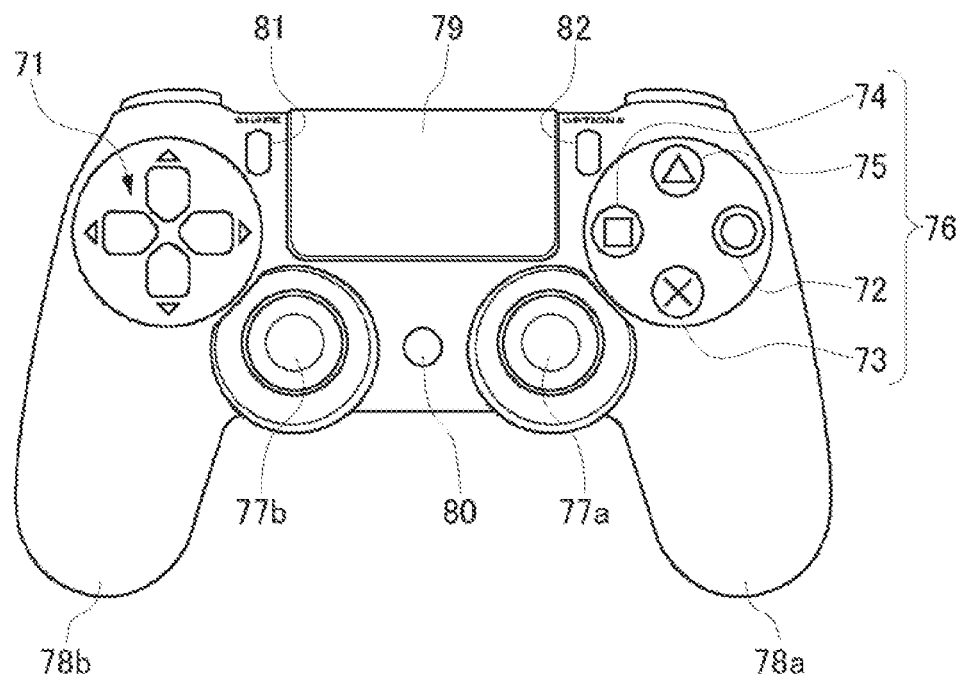
FIG. 2A is a diagram depicting an external constitution of an upper surface of an input device.

FIG. 1 depicts an information processing system 1 according to an embodiment of the present technology. The information processing system 1 includes an information processing device 10 as a user terminal and a server 5. An access point (hereinafter referred to as an "AP") 8 has functions of a wireless access point and a router. The information processing device 10 is connected to the AP 8 via radio or a wire to be communicatably connected to the server 5 on a network 3.

An auxiliary storage device 2 is a mass storage device such as a hard disk drive (HDD), a flash memory, or the like. The auxiliary storage device 2 may be an external storage device connected to the information processing device 10 by a universal serial bus (USB) or the like, or may be an internal storage device. An output device 4 may be a television set including a display for outputting an image and a speaker for outputting sound, or may be a computer display. The information processing device 10 is connected to an input device 6 operated by a user by radio or by wire. The input device 6 outputs an operation signal indicating a result of operation of the user to the information processing device 10. When the information processing device 10 receives the operation signal from the input device 6, the information processing device 10 reflects the operation signal in the processing of an operating system (OS) (system software) or an application, and makes a result of the processing output from the output device 4.

In the information processing system 1, the information processing device 10 may be a game device that executes a game, and the input device 6 may be a device such as a game controller or the like that provides the operation signal of the user to the information processing device 10. A camera 7 as an imaging device is provided in the vicinity of the output device 4. The camera 7 images a space around the output device 4. FIG. 1 depicts an example in which the camera 7 is attached to an upper portion of the output device 4. However, the camera 7 may be disposed on a side portion or a lower portion of the output device 4. In either case, the camera 7 is disposed in such a position as to be able to image the user located in front of the output device 4. The camera 7 may be a stereo camera.

The server 5 provides network service to the user of the information processing system 1. The server 5 manages a network account identifying each user. Each user signs in to the network service provided by the server 5 using the network account. By signing in from the information processing device 10 to the network service, the user can register, in the server 5, the save data of a game or a trophy, which is a virtual prize obtained during game play.

FIG. 1 depicts two users A and B operating input devices 6a and 6b as game controllers. The users A and B can each enjoy an application such as a game or the like by logging in to the OS of the information processing device 10.

A button configuration of the input device 6 will be described.

[Constitution of Upper Surface Portion]

FIG. 2A depicts an external constitution of an upper surface of the input device. The user operates the input device 6 while holding a left grip portion 78b with a left hand and holding a right grip portion 78a with a right hand. The upper surface of a casing of the input device 6 is provided with a direction key 71, analog sticks 77a and 77b, and four kinds of operating buttons 76 as input sections. The four kinds of buttons 72 to 75 are marked with different figures of different colors so as to be distinguished from one another. A touch pad 79 is provided in a flat region between the direction key 71 and the operating buttons 76 on the upper surface of the casing. The touch pad 79 also functions as a depression type button that sinks downward when pressed by the user and which returns to an original position when released by the user.

A function button 80 is provided between the two analog sticks 77a and 77b. The function button 80 is used to turn on power to the input device 6 and simultaneously activate a communication function that connects the input device 6 and the information processing device 10 to each other. Incidentally, when the main power supply of the information processing device 10 is off, and the function button 80 is depressed, the information processing device 10 receives a connection request transmitted from the input device 6 also as an instruction to turn on the main power supply. The main power supply of the information processing device 10 is thereby turned on. After the input device 6 is connected to the information processing device 10, the function button 80 is also used to display a home screen on the information processing device 10.

A SHARE button 81 is provided between the touch pad 79 and the direction key 71. The SHARE button 81 is used to input an instruction from the user to the OS or the system software in the information processing device 10. In addition, an OPTIONS button 82 is provided between the touch pad 79 and the operating buttons 76.

[Constitution of Side Surface Portion on Back Side]

Figure 2B:
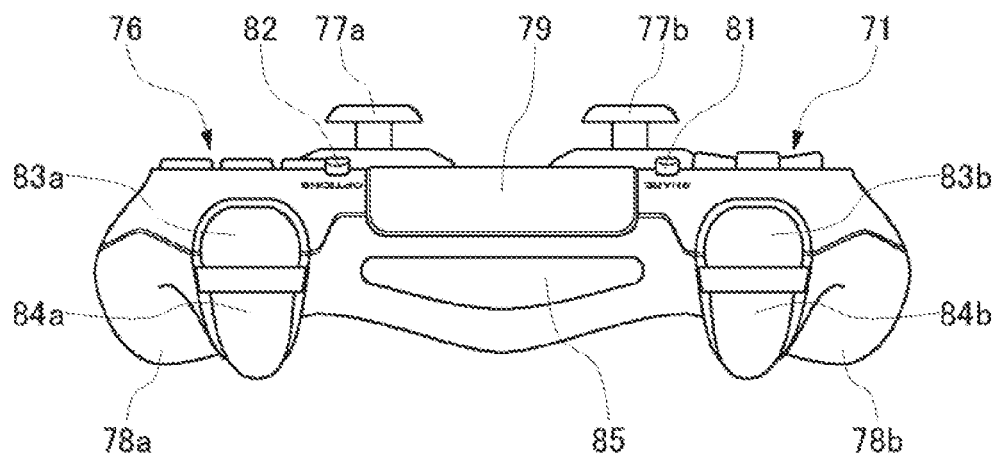
FIG. 2B is a diagram depicting an external constitution of a side surface on a back side of the input device.

FIG. 2B depicts an external constitution of a side surface on the back side of the input device. On the upper side of the side surface on the back side of the casing of the input device 6, the touch pad 79 is extended from the upper surface of the casing. A horizontally long light emitting portion 85 is provided on the lower side of the side surface on the back side of the casing. The light emitting portion 85 has a red (R) light emitting diode (LED), a green (G) LED, and a blue (B) LED. The light emitting portion 85 illuminates according to light emission color information transmitted from the information processing device 10. When the two input devices 6a and 6b are used as depicted in FIG. 1, the information processing device 10 may set different colors, or blue and red, as respective lighting colors of the light emitting portions 85 of the input devices 6a and 6b so that the users A and B can distinguish the respective input devices 6. Each user can thereby recognize the input device 6 that the user is using by the lighting color of the light emitting portion 85. A possibility of the user mistaking the input device 6 is therefore reduced.

On the side surface of the back side of the casing, an upper side button 83a, a lower side button 84a, an upper side button 83b, and a lower side button 84b are disposed at positions bilaterally symmetric in a longitudinal direction. The upper side button 83a and the lower side button 84a are operated by the index finger and the middle finger, respectively, of the right hand of the user. The upper side button 83b and the lower side button 84b are operated by the index finger and the middle finger, respectively, of the left hand of the user. The upper side button 83 may be configured as a push type button. The lower side button 84 may be configured as a rotatably supported trigger type button.

There have recently appeared games that reflect the movement of the user in the movement of a game character. In a game using the gesture of the user, the user does not need to have the input device 6, and can move a character intuitively. In such a game, the user does not use the input device 6 in the first place, and therefore it is desirable to perform user authentication without the use of the input device 6 also when the user logs in to the OS of the information processing device 10. Incidentally, enabling the user to log in after a simple user authentication is meaningful in the information processing system 1 regardless of the kind of the game that the user plays after logging in.

The information processing system 1 according to the present embodiment accordingly provides a technology that enables user authentication to be performed simply by face recognition processing using an image imaged by the camera 7.

Figure 3:
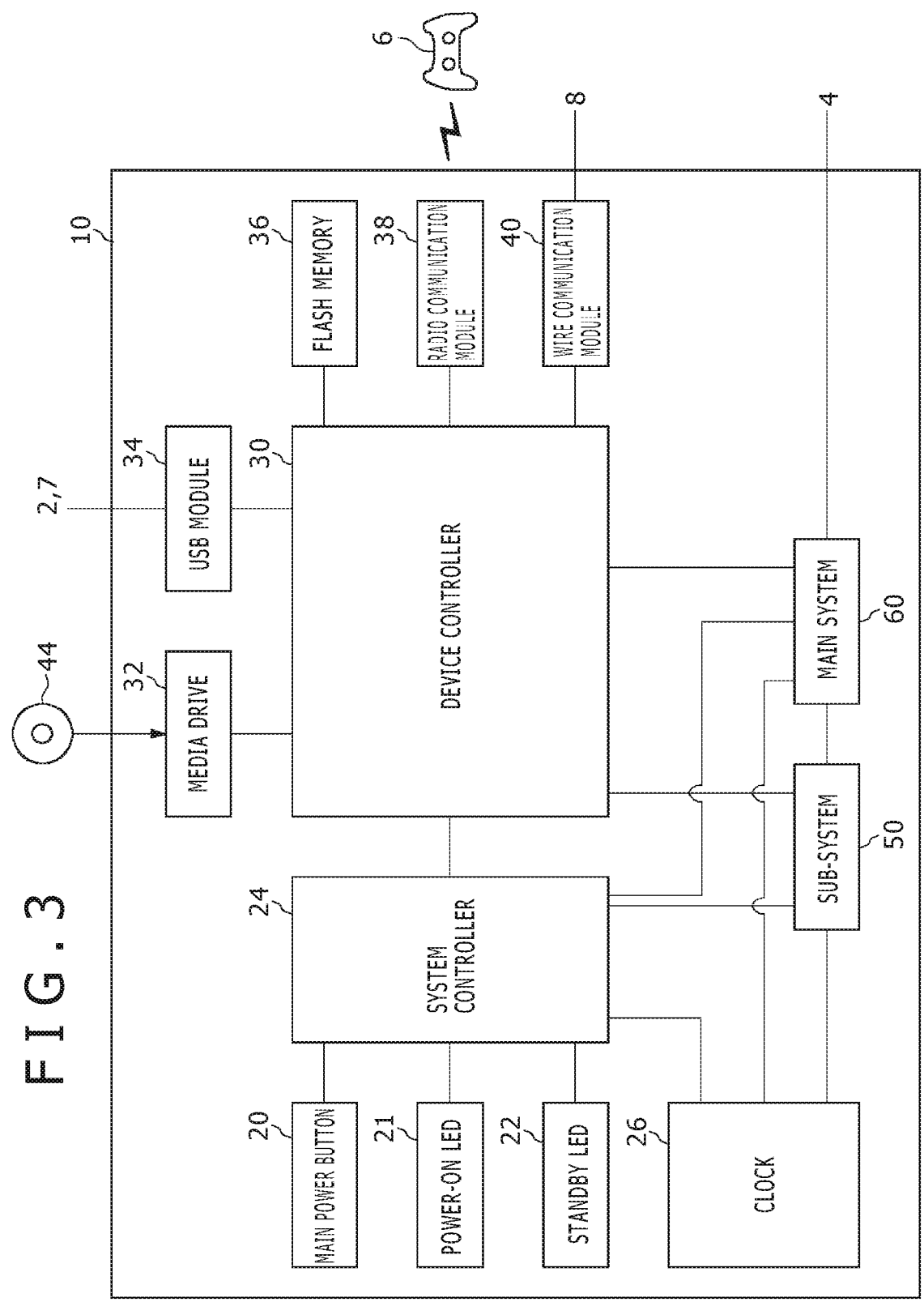
FIG. 3 is a functional block diagram of an information processing device.

FIG. 3 depicts a functional block diagram of the information processing device 10. The information processing device 10 includes a main power button 20, a power-on LED 21, a standby LED 22, a system controller 24, a clock 26, a device controller 30, a media drive 32, a USB module 34, a flash memory 36, a wireless communication module 38, a wire communication module 40, a subsystem 50, and a main system 60.

The main system 60 includes a main central processing unit (CPU), a memory as a main storage device and a memory controller, a graphics processing unit (GPU), and the like. The GPU is used mainly for arithmetic processing of a game program. These functions may be configured as a system-on-chip, and formed on one chip. The main CPU has functions of starting the OS, and executing an application installed in the auxiliary storage device 2 under an environment provided by the OS.

The subsystem 50 includes a sub-CPU, a memory as a main storage device and a memory controller, and the like. The subsystem 50 does not include a GPU. The sub-CPU operates also while the main CPU is in a standby state. The processing functions of the sub-CPU are limited to reduce the power consumption of the sub-CPU. Because the subsystem 50 is operating during standby of the main system 60, the information processing device 10 according to the present embodiment maintains a state of being signed in to the network service provided by the server 5 at all times.

The main power button 20 is an input section to which an operating input from the user is performed. The main power button 20 is provided to a front surface of a casing of the information processing device 10. The main power button 20 is operated to turn on or off the supply of power to the main system 60 of the information processing device 10. An on state of the main power supply will hereinafter mean that the main system 60 is in an active state. An off state of the main power supply will hereinafter mean that the main system 60 is in a standby state. The power-on LED 21 is lit when the main power button 20 is turned on. The standby LED 22 is lit when the main power button 20 is turned off.

The system controller 24 detects the depression of the main power button 20 by the user. When the main power button 20 is depressed while the main power supply is in an off state, the system controller 24 obtains the depressing operation as a "turn-on instruction." When the main power button 20 is depressed while the main power supply is in an on state, on the other hand, the system controller 24 obtains the depressing operation as a "turn-off instruction."

The clock 26 is a real-time clock. The clock 26 generates present date and time information, and supplies the present date and time information to the system controller 24, the subsystem 50, and the main system 60.

The device controller 30 is configured as a large-scale integrated circuit (LSI) that transfers information between devices like a Southbridge. As depicted in the figure, the device controller 30 is connected with devices such as the system controller 24, the media drive 32, the USB module 34, the flash memory 36, the wireless communication module 38, the wire communication module 40, the subsystem 50, the main system 60, and the like. The device controller 30 accommodates differences between electrical characteristics of the respective devices and differences between data transfer rates, and controls data transfer timing.

The media drive 32 is a drive device that is loaded with and drives a read only memory (ROM) medium 44 on which application software such as a game or the like and license information are recorded, and reads a program, data, and the like from the ROM medium 44. The ROM medium 44 is a read-only recording medium such as an optical disk, a magneto-optical disk, a Blu-ray disk, or the like.

The USB module 34 is a module connected to an external device by a USB cable. The USB module 34 may be connected to the auxiliary storage device 2 and the camera 7 by a USB cable. The flash memory 36 is an auxiliary storage device forming an internal storage. The wireless communication module 38 performs wireless communication with the input device 6, for example, under a communication protocol such as a Bluetooth (registered trademark) protocol, an Institute of Electrical and Electronic Engineers 802.11 (IEEE 802.11) protocol, or the like. Incidentally, the wireless communication module 38 may support a third-generation (3rd Generation) digital mobile telephone system compliant with an International Mobile Telecommunication 2000 (IMT-2000) standard defined by the International Telecommunication Union (ITU), or may further support a digital mobile telephone system of another generation. The wire communication module 40 performs wire communication with an external device. The wire communication module 40 is connected to the network 3 via the AP 8, for example.

The information processing device 10 according to the present embodiment prepares a plurality of kinds of login processing. When there is a login request from the user, the information processing device 10 according to the present embodiment determines one piece of login processing to be performed according to the generation conditions of the login request and whether or not face identifying data is registered, and provides the user with a user interface of the determined login processing. Outlines of three kinds of login processing will be described in the following.

<Login Processing 1>

In login processing 1, the information processing device 10 displays a user selecting screen on the output device 4. The user selects the icon of the user on the user selecting screen using the input device 6, and inputs a login passcode. Then, the information processing device 10 performs user authentication, and logs in the user.

<Login Processing 2>

In login processing 2, the information processing device 10 performs user face authentication (user authentication in a first stage) using an image imaged by the camera 7. When the information processing device 10 determines that a detected face image represents the face of a registered user, the information processing device 10 specifies, to the registered user, a position to which to move the input device 6 within the camera image depicted on the display. The user moves the input device 6 to the specified region. The information processing device 10 thereby performs user authentication (user authentication in a second stage) and logs in the user.

<Login Processing 3>

In login processing 3, the information processing device 10 performs user face authentication (user authentication in a first stage) using an image imaged by the camera 7. When the information processing device 10 determines that a detected face image represents the face of a registered user, the information processing device 10 specifies, to the registered user, a position to which to move the face within the camera image depicted on the display. The user moves the face to the specified region. The information processing device 10 thereby performs user authentication (user authentication in a second stage) and logs in the user.

The login processing 2 and the login processing 3 are similar to each other in that the login processing 2 and the login processing 3 both perform the user authentication in the first stage using an image imaged by the camera 7. However, the login processing 2 and the login processing 3 are different from each other in that the login processing 2 detects the movement of the input device 6 to a predetermined region, and performs the user authentication in the second stage, whereas the login processing 3 detects the movement of the face of the user to a predetermined region, and performs the user authentication in the second stage.

The user generally operates the input device 6 when playing a game. Recently, however, there have appeared games that reflect the movement of the user in the movement of a game character. In a game using the gesture of the user, the user does not use the input device 6 in the first place. It is therefore desirable to perform user authentication without the use of the input device 6 also when the user logs in to the OS of the information processing device 10.

Accordingly, the login processing 3 is performed for example when the user depresses the main power button 20 in a state in which the power to the information processing device 10 is off, or when a predetermined voice input is received from the user in a state in which the power is on, rather than when the user transmits a login request from the input device 6 to the information processing device 10.

Figure 4:
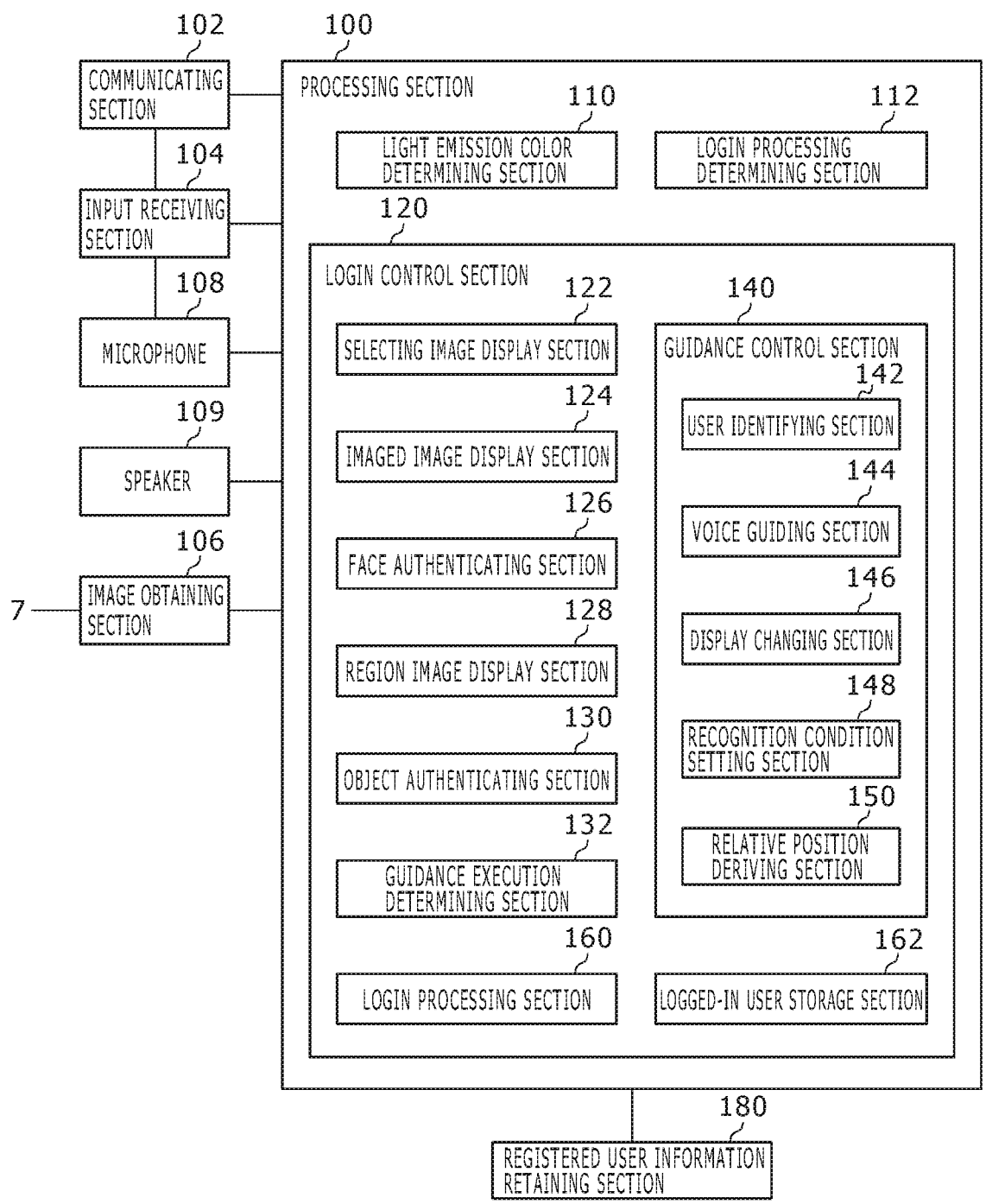
FIG. 4 is a diagram depicting a configuration of the information processing device.

FIG. 4 depicts a configuration of the information processing device 10. The information processing device 10 includes a communicating section 102, an input receiving section 104, an image obtaining section 106, a microphone 108, a speaker 109, a processing section 100, and a registered user information retaining section 180. The processing section 100 includes a light emission color determining section 110, a login processing determining section 112, and a login control section 120. The functions of these sections are implemented by the OS of the information processing device 10 (system software), an application executed by the OS, and a memory. The login control section 120 includes a selecting image display section 122, an imaged image display section 124, a face authenticating section 126, a region image display section 128, an object authenticating section 130, a guidance execution determining section 132, a guidance control section 140, a login processing section 160, and a logged-in user storage section 162. The communicating section 102 represents the functions of the wireless communication module 38 and the wire communication module 40 depicted in FIG. 3.

The elements described as functional blocks performing various processing in FIG. 4 can be configured by a circuit block, a memory, or another large-scale integration (LSI) in terms of hardware, and are implemented by a program loaded in a memory or the like in terms of software. Hence, it is to be understood by those skilled in the art that these functional blocks can be implemented in various forms by only hardware, only software, or combinations of hardware and software, and are not limited to any one of the forms.

As a precondition for logging in to the OS of the information processing device 10, the user needs to obtain a user account in advance, and register various user information in the information processing device 10. A user who has registered a user account in the information processing device 10 may hereinafter be referred to as a "registered user."

The registered user information retaining section 180 retains various information related to the registered user. Specifically, the registered user information retaining section 180 retains, as registered user information in association with the user account, a login passcode, a sign-in identification (ID) for signing in to the server 5, a network account, the online ID (user name on the network) of the user, a user icon for representing the user, and the like. Incidentally, as for a registered user who has registered a face image in advance for face authentication processing, the registered user information retaining section 180 retains face identifying data as registered user information in association with the user account.

In this case, the face identifying data is data on feature quantities of the face image of the registered user. However, the face identifying data may be face image data itself. The face identifying data is set as an object of comparison in face recognition processing by the face authenticating section 126, and is generated according to a face recognition algorithm adopted by the face authenticating section 126. The face identifying data may be for example data obtained by extracting, as features, the relative positions and sizes of parts of the face and the shapes of eyes, a nose, a cheekbone, and a chin. In addition, the face identifying data may be data extracted as difference data from face image standard data. Which kind of face identifying data to extract is determined by the adopted face recognition algorithm. In the present embodiment, the face authenticating section 126 adopts a known face recognition algorithm.

As will be described later, the information processing device 10 constructs a mechanism that enables even a registered user having weak eyesight to log in by the login processing 2 and the login processing 3 while feeling the visual impairment as little as possible. The registered user information retaining section 180 according to the embodiment includes assistance setting information depicting whether or not to provide the registered user with login assistance at a time of login as attribute information of the registered user. Incidentally, the provision of this login assistance is one of user options related to user accessibility. When the user registers the user account, the user can select whether or not to be provided with the login assistance, and register the selection.

In the following, before description of assistance processing for the registered user to be provided with login assistance, description will be made of processing when the user logs in to the information processing device 10 without being provided with login assistance. The login processing determining section 112 determines login processing to be performed from among the pieces of login processing 1 to the login processing 3.

A method of the determination by the login processing determining section 112 will be described in brief. When the user intending to log in has not registered face identifying data, it is difficult to perform the face authentication processing in the first stage in the login processing 2 and the login processing 3. The login processing determining section 112 therefore determines the login processing 1 as login processing to be performed. On the other hand, when the face identifying data is registered, and the user inputs a login request from the input device 6, the login processing determining section 112 determines the login processing 2 as login processing to be performed. When the face identifying data is registered, and the user inputs a login request from other than the input device 6, the login processing determining section 112 determines the login processing 3 as login processing to be performed.

This determination processing is basically performed automatically without troubling the user. The user is therefore provided with a user interface suitable for the conditions of the user.

<Login Processing 1>

When the user depresses a predetermined button (for example the function button 80) of the input device 6, information on the depression is transmitted to the information processing device 10. In the information processing device 10, the communicating section 102 receives the depression information as a connection request, and connects the input device 6 to the communicating section 102. In addition, the information on the depression of the function button 80 is transmitted to the input receiving section 104, and the input receiving section 104 receives the depression information as a login request from the user and notifies the login request to the processing section 100.

First, the light emission color determining section 110 determines the light emission color of the light emitting portion 85 of the input device 6 that transmitted the login request. After the light emission color determining section 110 determines the light emission color, the communicating section 102 transmits light emission color information to the input device 6. When the light emission color information specifies blue, the light emitting portion 85 of the input device 6 illuminates in blue.

The image obtaining section 106 obtains imaged image data from the camera 7. For example, the camera 7 images a space periodically (at intervals of ⅓₀ of a second, for example), and provides the imaged image to the image obtaining section 106 via the USB module 34. Incidentally, the camera 7 may provide the imaged image to the image obtaining section 106 at all times while the main power supply is on.

The selecting image display section 122 reads registered user information retained in the registered user information retaining section 180, and generates a selecting image for selecting a user registered in the information processing device 10. Specifically, the selecting image display section 122 reads user icons and online IDs (user names) from the registered user information, and displays, on the output device 4, a user selecting screen where the online IDs of registered users are arranged in a list format. This selecting screen constitutes a login screen in the login processing 1. As will be described later, at a time of initial display of the selecting screen, processing of determining whether or not to perform the login processing 2 is performed. After it is determined that the login processing 2 is not to be performed, the user selecting screen formally constitutes the login screen in the login processing 1.

Figure 5A:
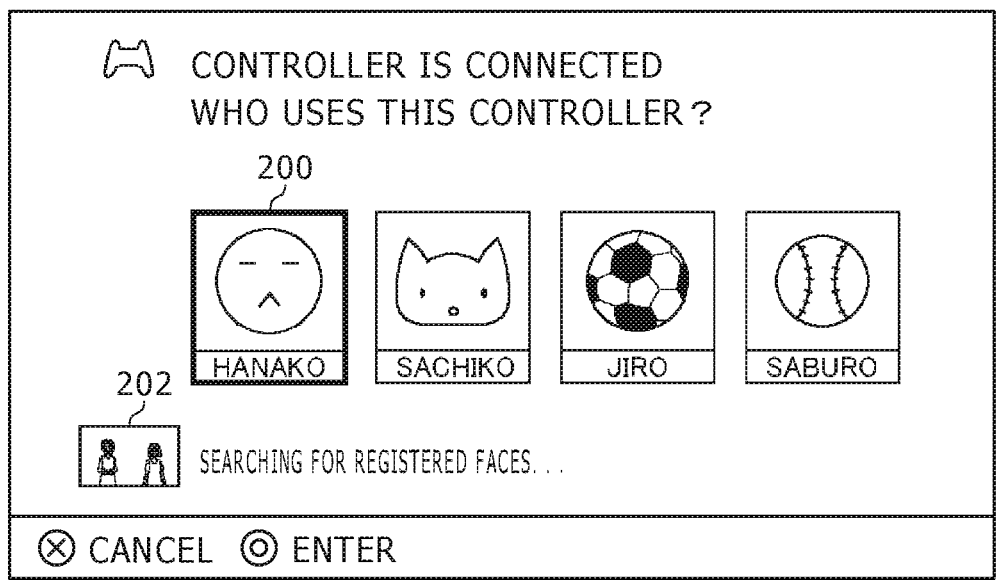
FIG. 5A is a diagram depicting a user selecting screen.

FIG. 5A depicts an example of the user selecting screen. The selecting image display section 122 reads the user icons and online IDs of all of registered users whose registered user information is retained in the registered user information retaining section 180, and displays the read user icons and the read online IDs in a list format so as to be selectable by the user. The user icons and the online IDs will hereinafter be referred to as "user identifying information."

The imaged image display section 124 displays the imaged image obtained by the image obtaining section 106 in a small window region 202 as a part of the user selecting screen. This display image is a live image of the camera 7. A message "searching for registered faces" is displayed in the vicinity of the small window region 202. This message is displayed during face authentication processing by the face authenticating section 126. Hence, when the face authentication processing is ended, the message display disappears. That is, in the state depicted in FIG. 5A, while the user selecting screen is displayed, the face authenticating section 126 operating in the background reads the face identifying data of all of the registered users from the registered user information retaining section 180, and checks whether there are users whose face images are registered in the imaged image.

The face authenticating section 126 extracts a part assumed to be the face of a person in the imaged image, and derives feature quantity data of the part. The face authenticating section 126 next determines whether or not the extracted face is the face of a registered user by comparing the extracted face with the read face identifying data.

Specifically, the face authenticating section 126 derives degrees of coincidence between the feature quantity data of the extracted user face image and the face identifying data of all of the registered users which face identifying data is read from the registered user information retaining section 180. The degrees of coincidence are expressed by numerical values, and the degrees of coincidence are derived in the form of a score on a scale of 100, for example. When a degree of coincidence with the feature quantity data of a registered face image exceeds a score of 90, the face authenticating section 126 determines that the imaged user is a registered user, and identifies which registered user the imaged user is. Incidentally, when there are a plurality of degrees of coincidence exceeding the score of 90, it suffices for the face authenticating section 126 to determine that the imaged user is the registered user of face identifying data from which a highest score is derived. Incidentally, when none of the degrees of coincidence exceeds the score of 90 as a result of deriving the degrees of coincidence between the feature quantity data of the user face image extracted from the imaged image and the face identifying data of all of the registered users, the face authenticating section 126 determines that the user included in the imaged image is not a registered user. The face authenticating section 126 thus detects the face image of the registered user present in the imaged image using the face identifying data read from the registered user information retaining section 180. A known technology may be used as this face identifying technology.

When the face authenticating section 126 determines that none of the users included in the imaged image is a registered user, the login processing section 160 sets the message displayed as "searching for registered faces" in a non-display state, and also sets the small window region 202 in a non-display state. When the face authenticating section 126 thus determines that the image imaged by the camera 7 does not include users whose face images are registered, the login processing determining section 112 determines the login processing 1 as login processing to be performed. Thus, the selecting image display section 122 continues the display of the user selecting screen, and the login processing section 160 starts the login processing 1. A time of the determination by the face authenticating section 126 is a few seconds. The small window region 202 and the message are therefore displayed only for a few seconds on the user selecting screen. Incidentally, the small window region 202 may be displayed until the user selects the user identifying information of the user in the login processing 1, and the message may be displayed until the user operates an input section of the input device 6.

In the login processing 1, on the user selecting screen, the login processing section 160 displays a focus frame 200 surrounding one piece of user identifying information so as to be movable on the list. The user moves the focus frame 200 to the display region of the user identifying information of the user by operating the input section of the input device 6, and presses a predetermined determination button of the input device 6. The user can thereby select the user identifying information of the user.

Figure 5B:
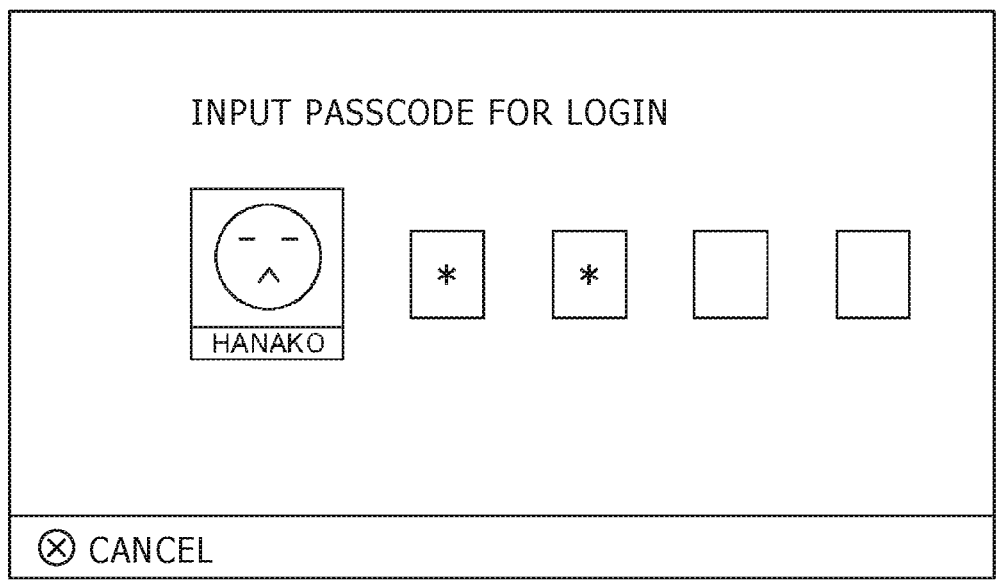
FIG. 5B is a diagram depicting a passcode input screen.

In this case, when the user requesting login selects "HANAKO" on the selecting screen by operating the input device 6, the login processing section 160 displays a passcode input screen depicted in FIG. 5B on the output device 4. When the user inputs a registered passcode on the passcode input screen, the login processing section 160 determines whether or not to allow the user to log in by determining whether the input passcode is the same as the login passcode of the user which login passcode is retained in the registered user information retaining section 180. The login processing section 160 stores login information, that is, information (user account) identifying the user and information (game controller ID) identifying the input device 6 used by the user in association with each other in the logged-in user storage section 162. The login control section 120 performs the user login processing 1 as described above. The above is description of the login processing 1.

Suppose in the following that the face identifying data of the users A and B is stored in the registered user information retaining section 180, that the online ID of the user A is "HANAKO," and that the online ID of the user B is "SACHIKO."

<Login Processing 2>

As described above, when the user generates a login request by operating the input device 6, and the face authenticating section 126 determines that there is no user whose face image is registered in the imaged image, the login processing 1 is performed. On the other hand, when the face authenticating section 126 determines that there is a user whose face image is registered in the imaged image in the case where the user generates a login request by operating the input device 6, the login processing determining section 112 determines the login processing 2 as login processing to be performed. Incidentally, the detected user needs to be a user who has not logged in. This face authentication processing is placed as user authentication in the first stage.

Figure 6A:
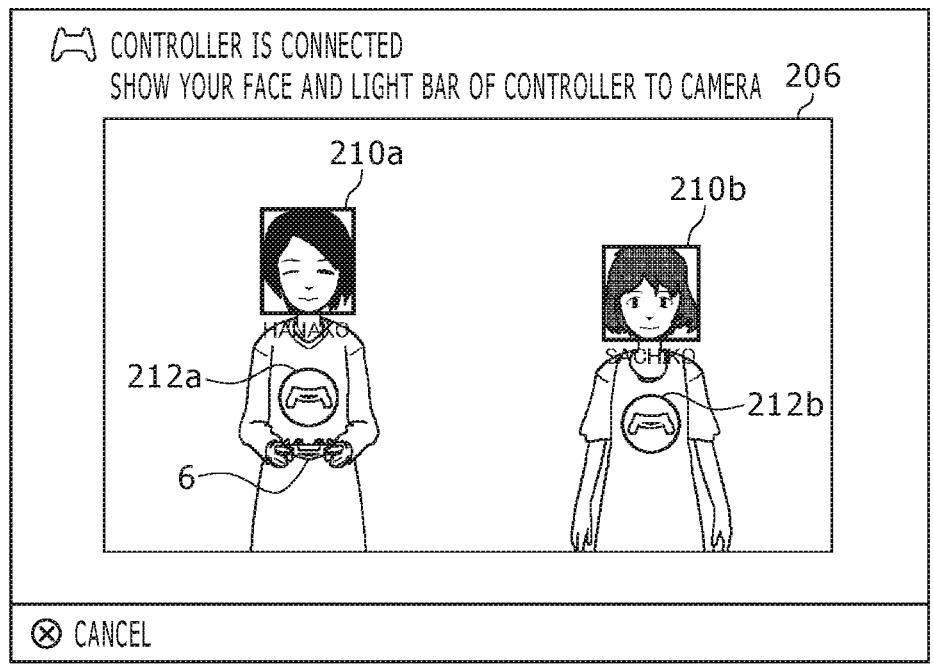
FIGS. 6A and 6B are diagrams depicting an example of a login screen in login processing 2.

FIG. 6A depicts a login screen in the login processing 2. The login screen depicted in FIG. 6A is displayed on the output device 4 after the face authenticating section 126 detects a user whose face image is registered in the imaged image while the user selecting screen depicted in FIG. 5A is displayed and then the user selecting screen is set in a non-display state. The imaged image display section 124 makes live display of an image imaged by the camera 7 in an imaged image display region 206 on the login screen in the login processing 2.

The face authenticating section 126 sets a face region indicating the position of the face of the user A (online ID: HANAKO) in the imaged image and a face region indicating the position of the face of the user B (online ID: SACHIKO) in the imaged image. The login processing section 160 displays face frames 210 on the registered users on the basis of the position coordinates of the respective face regions and information identifying the imaged registered users.

In this case, a face frame 210a is displayed on the user A, and a face frame 210b is displayed on the user B. At this time, the login processing section 160 displays the online ID (HANAKO) of the user A in the vicinity of the face frame 210a, and displays the online ID (SACHIKO) of the user B in the vicinity of the face frame 210b. The users A and B can thereby know that the faces of the users are recognized. Incidentally, when an online ID different from the online ID of the user is displayed in the vicinity of the face frame 210 of the user, the user can know that the face recognition is not performed properly.

For a registered user detected by the face authenticating section 126, the region image display section 128 displays a region image 212 specifying a region to which an object is to be moved on the output device 4 as a display. In the login processing 2, the region image 212 is an object frame specifying a region to which to move the input device 6. When the registered user moves the input device 6 to the region image 212, user authentication in the second stage is performed. Incidentally, as depicted in the figure, the object frame includes a game controller image to clarify that the object to be moved is the input device 6 (game controller). The object authenticating section 130 monitors whether an image of the input device 6 is included within the specified region specified by a region image 212a in the imaged image.

Figure 6B:
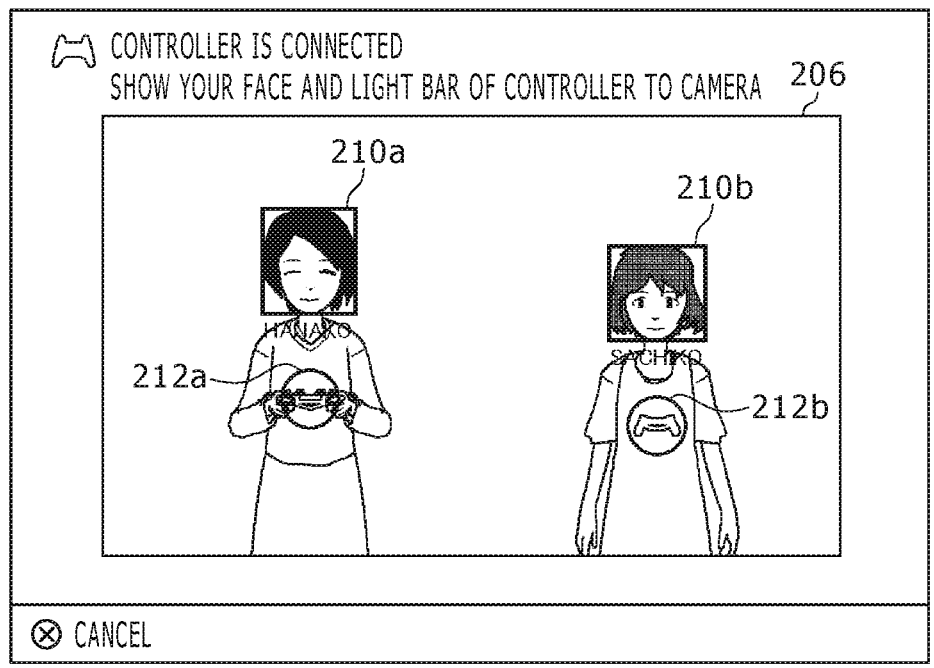

FIG. 6B depicts the login screen in which the user has moved the input device 6 to the position specified by the region image 212. In this case, a state is depicted in which the user A has lifted up the input device 6 and moved the input device 6 into the region image 212a.

The object authenticating section 130 recognizes that the input device 6 has been moved into the object frame specified by the region image 212a displayed for the user A. This object authentication processing is placed as user authentication in the second stage, and determines that the user A has performed a login operation. The login processing section 160 logs in the user A to the information processing device 10. The login processing section 160 stores login information, that is, information (user account) identifying the user A and information (game controller ID) identifying the input device 6a used by the user A in association with each other in the logged-in user storage section 162.

As described above, in the login processing 2, the face authenticating section 126 performs face authentication (user authentication in the first stage), and then the object authenticating section 130 detects that the input device 6 is included within the specified region (user authentication in the second stage). The login processing section 160 accordingly logs in the registered user. The login processing section 160 and the region image display section 128 refer to the logged-in user storage section 162, and do not display the face frame 210 and the region image 212 for an already logged-in user. For example, when the user B (online ID: SACHIKO) on the right side of the screen is an already logged-in user, the face frame 210b and a region image 212b are not displayed.

<Login Processing 3>

The login processing 3 will next be described. In the login processing 3, the user logs in without using the input device 6.

When the user depresses the main power button 20 of the information processing device 10, for example, the main power supply of the information processing device 10 is turned on, and the input receiving section 104 receives information on the depression of the main power button as a request to log in by the login processing 3. In addition, when the microphone 108 obtains a predetermined utterance by the user, for example, the input receiving section 104 may receive the utterance as a request to log in by the login processing 3.

When the input receiving section 104 receives a request to log in by the login processing 3, the imaged image display section 124 displays an imaged image obtained by the image obtaining section 106 on the output device 4. Thus, the output device 4 displays the live image photographed by the camera 7, and the user in front of the output device 4 appears on the output device 4.

Also in the login processing 3, as described in relation to the login processing 1 and the login processing 2, the face authenticating section 126 detects the face image of a registered user present in the imaged image using the face identifying data read from the registered user information retaining section 180. This processing is automatically performed in the background without the user being made aware of the processing. The login processing determining section 112 consequently determines the login processing 3 as login processing to be performed. In the login processing 3, this face authentication processing is placed as user authentication in the first stage.

Figure 7A:
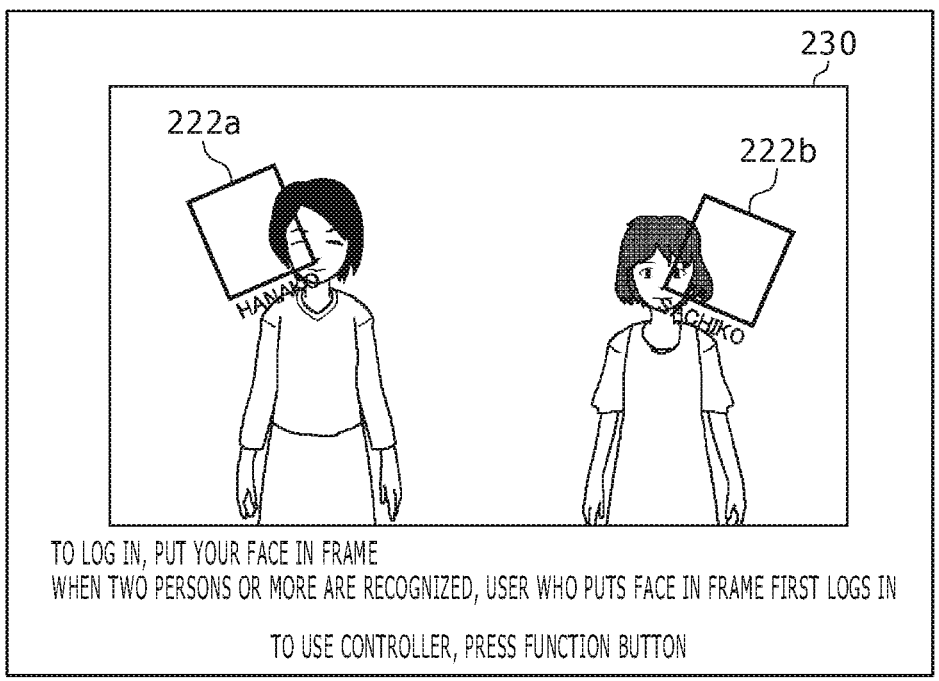
FIGS. 7A and 7B are diagrams depicting an example of a login screen in login processing 3.

FIG. 7A depicts a login screen including face frames which login screen is displayed on the output device 4. The imaged image display section 124 makes live display of the image imaged by the camera 7 in an imaged image display region 230 on the login screen in the login processing 3.

The face authenticating section 126 sets a face region indicating the position of the face of the user A (online ID: HANAKO) in the imaged image and a face region indicating the position of the face of the user B (online ID: SACHIKO) in the imaged image. The region image display section 128 displays, on the registered users, region images 222 specifying regions to which to move an object on the basis of the position coordinates of the respective face regions and information identifying the imaged registered users. The region images 222 in this case are face frames specifying regions to which to move the faces of the users.

In this case, a region image 222a is displayed on the user A, and a region image 222b is displayed on the user B. At this time, the login processing section 160 displays the online ID of the user A in the vicinity of the region image 222a, and displays the online ID of the user B in the vicinity of the region image 222b. The users A and B can thereby know that the faces of the users are properly recognized, and know that it suffices to move the faces to the region images 222a and 222b at a time of logging in.

Figure 8:
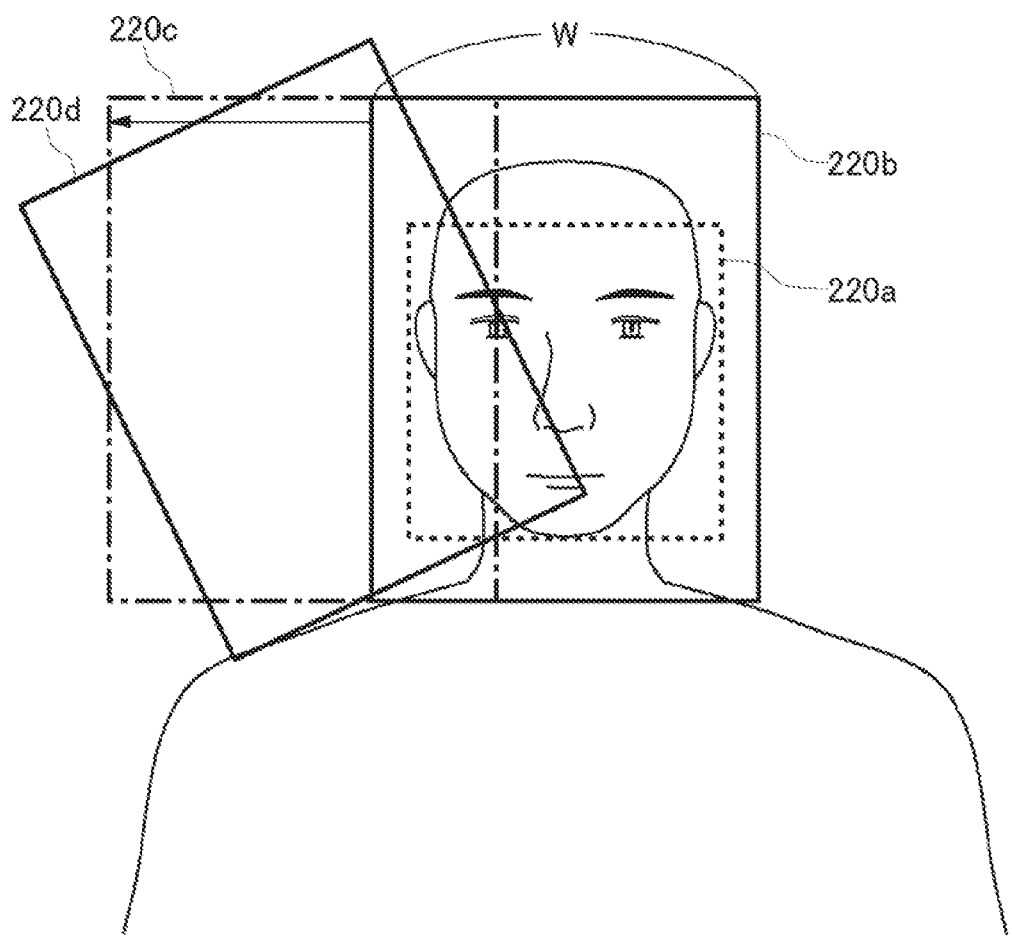
FIG. 8 is a diagram of assistance in explaining an example of a method of creating a region image by a region image display section.

FIG. 8 is a diagram of assistance in explaining an example of a method of creating a region image 222 by the region image display section 128. A detection region 220a represents a rectangular region to be compared with face identifying data for face identification by the face authenticating section 126. The region image display section 128 sets an enlarged region 220b obtained by enlarging the detection region 220a vertically and horizontally. The enlarged region 220b is set by enlarging the detection region 220a SFa times in a vertical direction and enlarging the detection region 220a SFb times in a horizontal direction. The region image display section 128 sets a horizontal movement region 220c obtained by moving the enlarged region 220b to the left or right by a length shorter than a width W in the horizontal direction of the enlarged region 220b. The region image display section 128 sets a rotated region 220d obtained by rotating the horizontal movement region 220c by an angle α about the center of gravity of the horizontal movement region 220c in a direction in which the upper side of the horizontal movement region 220c moves away from the face. The angle α may be for example larger than 10 degrees and smaller than 30 degrees. The region image display section 128 creates a region image 222 as a face frame by thus setting the rotated region 220d and applying a predetermined color to the outer frame of the rotated region 220d. The method of creating the region image 222 is an example.

The rotated region 220d may be moved further downward, and the region image 222 may be created at the position.

Figure 7B:
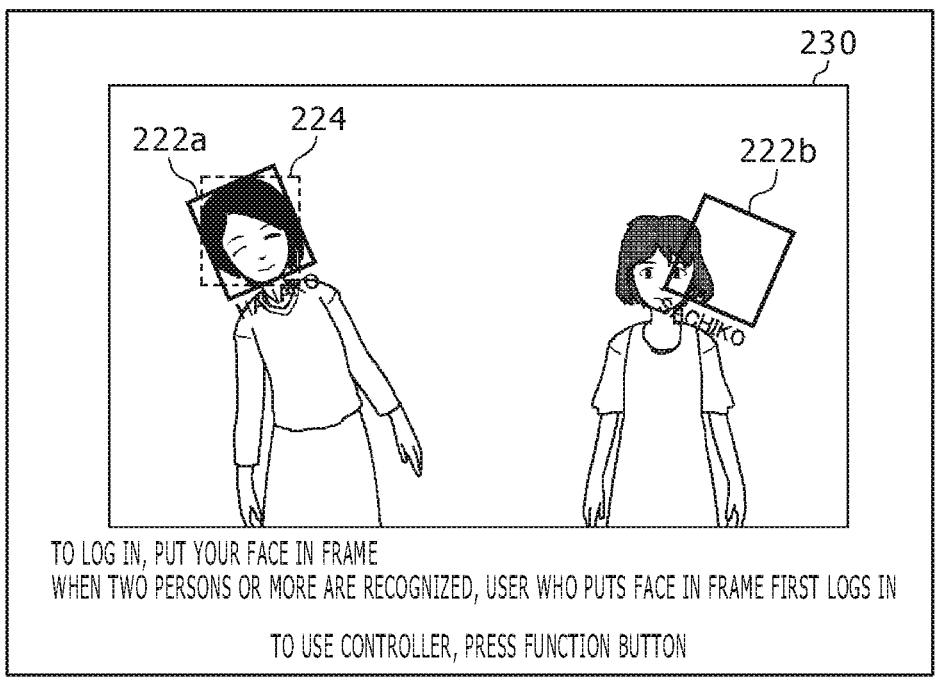

FIG. 7B depicts the login screen in which a user has put the face in the face frame. In this case, a state is depicted in which the user A has moved the face and body so as to put the face in the region image 222a displayed on the output device 4. Incidentally, the region image 222a is set to a size substantially equal to that of the face of the user in the example depicted in the figure, but may be set slightly larger than the face of the user, as described in relation to FIG. 8. The face authenticating section 126 monitors whether the face of a person is included in the region image 222. When a face is included in the region image 222, the face authenticating section 126 determines whether the face included in the region image 222 is the face of a registered user, using the face identifying data read from the registered user information retaining section 180.

The face authenticating section 126 monitors whether the face of a person is included in the region image 222 on the basis of the position coordinates of the region image 222. Specifically, the face authenticating section 126 sets a region obtained by reducing a rectangular region defined by a horizontal Feret diameter and a vertical Feret diameter of the region image 222a as a comparison region 224 for identifying a face image, and monitors whether the face of a person is included in the comparison region 224. When the face authenticating section 126 estimates that the face of a person is included in the comparison region 224, the face authenticating section 126 derives the feature quantity data of the part, compares the feature quantity data with the read face identifying data, and determines that the extracted face is the face of a registered user. In the example of FIG. 7B, the face authenticating section 126 determines that the face included in the comparison region 224 is the face of the user A. In the login processing 3, this processing is placed as user authentication in the second stage. When the user authentication in the first stage and the second stage is completed, the user authentication at the time of login is ended, and the login processing section 160 logs in the user A to the information processing device 10.

The plurality of pieces of login processing by the information processing device 10 have been described above. In the login processing 2 or the login processing 3, the user puts the input device 6 or the face in the region image 212 or 222 displayed on the output device 4. Therefore, a user having poor eyesight may not be able to clearly see the frame specified by the region image, and may thus feel inconvenience. In addition, as depicted in FIGS. 6A to 7B, descriptive sentences related to login operation are displayed on the screen, and the online ID of the user is displayed in the vicinity of the face frame. However, when the user has poor eyesight, the user may not be able to clearly see these pieces of information either. Therefore, the user may not be able to grasp what kind of operation should be performed to log in, or whether the user is recognized correctly. In this case, the login processing 2 and the login processing 3 devised to make the user easily log in causes a disadvantage in that login is not easy for a certain user.

Accordingly, in the embodiment, the guidance control section 140 assists in login operation in the login processing 2 and the login processing 3 by providing guiding assistance for login operation. Specifically, in the login processing 2 and the login processing 3, the guidance control section 140 provides guiding assistance for making it easier to move an object (face or the input device) to the region specified by the region image. That is, in the login processing 2 and the login processing 3 described with reference to FIGS. 6A to 7B, login operation is supported to provide an environment in which the user logs in easily and thus improve user accessibility.

Incidentally, the function of the guidance control section 140 is performed for a user who has registered assistance setting information indicating the reception of login assistance in the registered user information retaining section 180. The login control section 120 does not always perform the function of the guidance control section 140. The guidance execution determining section 132 determines whether or not to perform the function of the guidance control section 140.

The guidance execution determining section 132 determines whether or not to perform the function of the guidance control section 140 on the basis of setting information registered in the information processing device 10 or the attribute information of the registered user detected by the face authenticating section 126 in the user authentication in the first stage. The setting information registered in the information processing device 10 in this case is information registered on a setting screen related to user login, and is information selecting whether to perform login processing in a "normal mode" or to perform login processing in a "login assistance mode" at a time of a user login. The login processing in the normal mode is the login processing described with reference to FIGS. 6A to 7B. The login processing in the login assistance mode is login processing realized by adding guiding assistance to the login processing described with reference to FIGS. 6A to 7B. The "login processing in the normal mode" is selected in an initial state of the login setting screen. When the user selects "login processing in the login assistance mode" on the login setting screen, this setting information is registered in the information processing device 10. When the "login processing in the login assistance mode" is thus registered as the setting information in the information processing device 10, the guidance execution determining section 132 determines that the function of the guidance control section 140 is to be performed. Incidentally, when the "login processing in the normal mode" is registered as the setting information in the information processing device 10, the guidance execution determining section 132 determines whether or not to perform the function of the guidance control section 140 on the basis of the attribute information of the registered user.

The attribute information of the registered user is the assistance setting information indicating whether or not the registered user receives the provision of login assistance, and is registered in the registered user information retaining section 180. In the login processing 2 and the login processing 3, the face authenticating section 126 performs face authentication in the first stage without the user being made aware of the face authentication. When the face authenticating section 126 detects the registered user imaged by the camera 7, the guidance execution determining section 132 refers to the attribute information of the detected registered user (assistance setting information), and determines whether or not the user desires to be provided with login assistance. At this time, when the user desires to be provided with login assistance, the guidance execution determining section 132 determines that the function of the guidance control section 140 is to be performed. Hereinafter, a user who has registered an intention to receive the provision of login assistance as the assistance setting information will be referred to as an "assistance desiring user," and a user who has registered an intention not to receive the provision of login assistance as the assistance setting information will be referred to as an "ordinary user." Incidentally, when the face authenticating section 126 detects a plurality of registered users, and there is at least one assistance desiring user, the guidance execution determining section 132 determines that the function of the guidance control section 140 is to be performed. Incidentally, when all of the detected registered users are ordinary users, the guidance execution determining section 132 determines that the function of the guidance control section 140 is not to be performed. The guidance execution determining section 132 thus achieves an improved efficient user accessibility.

The following description will be made of login assistance processing for an assistance desiring user in relation to the login processing 3. Incidentally, when the "login processing in the login assistance mode" described above is registered in the information processing device 10, login assistance to be described in the following may be performed without distinction between an assistance desiring user and an ordinary user. However, the following description will be made of a case where login assistance processing is performed for only an assistance desiring user on the basis of the attribute information of the user.

The guidance control section 140 includes a user identifying section 142, a voice guiding section 144, a display changing section 146, a recognition condition setting section 148, and a relative position deriving section 150. The guidance control section 140 provides login assistance for an assistance desiring user. The user to be assisted is an assistance desiring user who has not logged in yet. The user identifying section 142 identifies the assistance desiring user detected by the face authenticating section 126 by the user authentication in the first stage. For example, FIG. 7A depicts a state in which the face authenticating section 126 has detected two users A and B who have not logged in. When the user A (HANAKO) of the two users is an assistance desiring user, and the user B (SACHIKO) is an ordinary user, the user identifying section 142 identifies the user A as a login assistance object user.

The voice guiding section 144 outputs a voice guidance for login assistance to the user A. Referring to FIG. 7A, characters of the online ID (HANAKO) of the user A are displayed as text in the vicinity of the face of the user A. However, when the user A has poor eyesight, the user A may not be able to read (see) the characters. In addition, the user A may not be able to read the descriptive sentences related to login operation which sentences are depicted below the imaged image display region 230. Accordingly, the voice guiding section 144 performs audio output of the user name (online ID) of the user A and the descriptive sentences from the speaker 109. For example, the voice guiding section 144 may make a notification by voice such as "HANAKO-san is detected. When HANAKO-san desires to log in, please put the face in the face frame." This enables the user A to know that the face of the user A is recognized, and to know the method of login operation.

The voice guiding section 144 may perform audio output of a direction in which the user A is to incline the head from the speaker 109. For example, the voice guiding section 144 may make a voice notification such as "HANAKO-san, please incline your face to the left so that your face is in the face frame." In addition, the voice guiding section 144 may express, by audio, a distance between the face of the user A and the region image 222a. The relative position deriving section 150 may derive relative positional relation between the face of the user A and the region image 222a. While the user A is inclining the face, the voice guiding section 144 may inform the user A whether the user A is performing correct login operation by making the intervals, type, tone, or the like of sound differ between a case where the face of the user A is approaching the region image 222*a* and a case where the face of the user A is moving away from the region image 222*a*. It is desirable that the voice guiding section 144 thus output a sound that guides the movement of the user from the speaker 109. The user A can thereby know the operation to be performed to log in by the sound notification even when the user A does not clearly see the region image 222*a*.

The display changing section 146 performs processing of changing the display mode of the region image 222*a* displayed as a face frame for the user A from the normal mode. Specifically, the face frame of the user A as an assistance desiring user is highlighted to make the user A see the face frame easily. The user A becomes able to perform login operation easily by receiving the voice guidance by the voice guiding section 144 and further having the face frame highlighted. The display changing section 146 instructs the region image display section 128 to change the region image 222. The region image display section 128 thereby displays the region image 222 in the login assistance mode in a manner different from the normal mode.

Figure 9A:
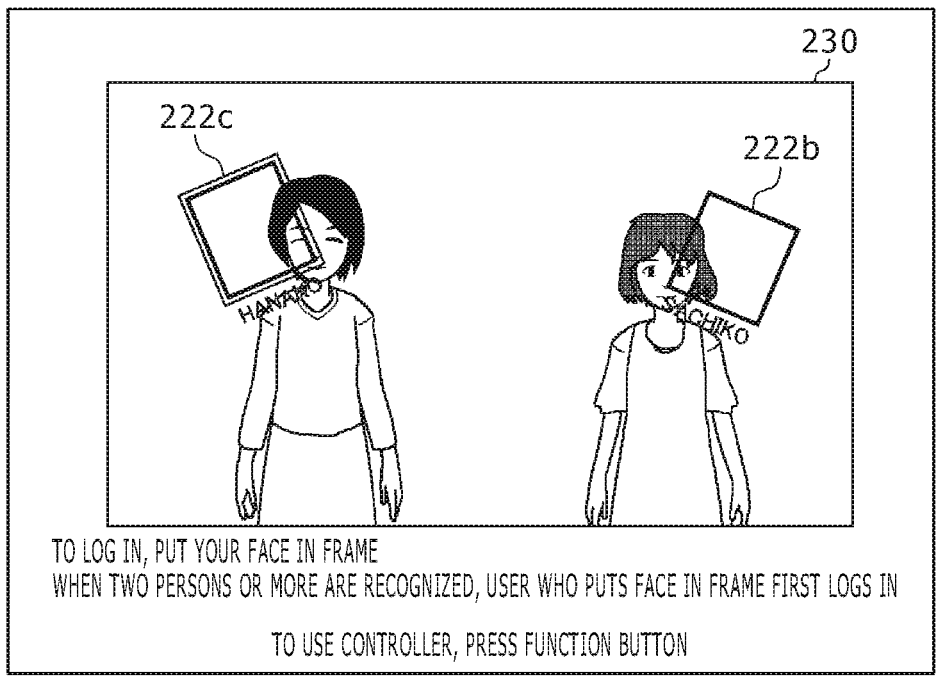
FIGS. 9A and 9B are diagrams depicting examples of highlighting a region image as a face frame.

FIG. 9A depicts an example of highlighting a region image as a face frame. The region image display section 128 displays a region image 222*c* obtained by making the face frame of the user A as an assistance desiring user thicker than normal. Incidentally, the region image display section 128 may display the face frame with the color, size, shape, or the like of the face frame made different than in the normal mode. Incidentally, when the display color is to be changed, the display changing section 146 may extract a background color present at a position where the face frame is displayed, set a color conspicuous against the background color as the color of the face frame, and notify the color of the face frame to the region image display section 128.

Figure 9B:
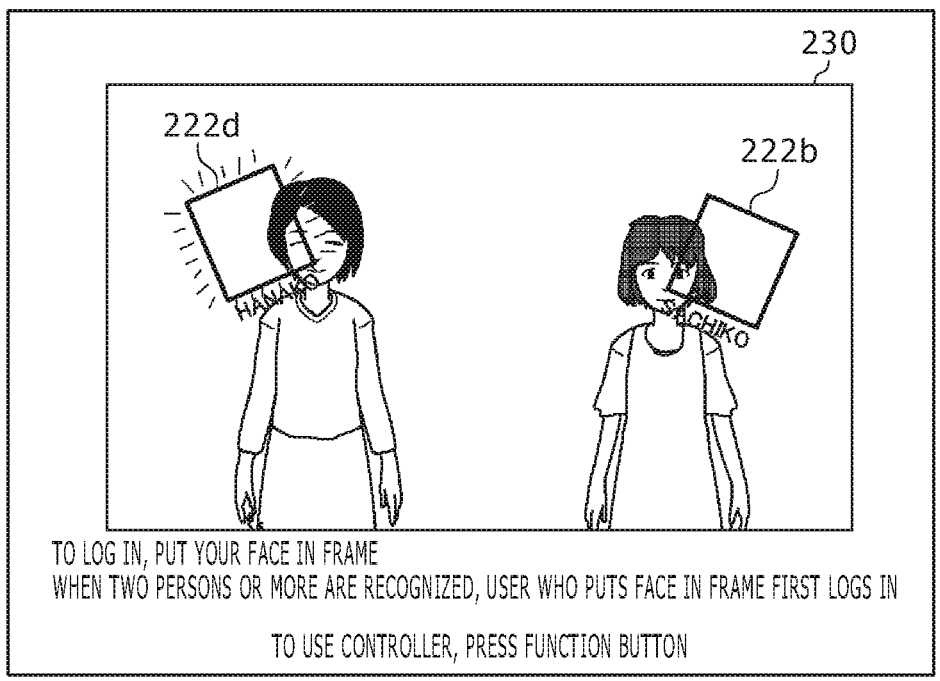

FIG. 9B depicts another example of highlighting a region image as a face frame. The region image display section 128 displays a region image 222*d* blinking the face frame of the user A. Incidentally, the region image display section 128 may display the face frame in a conspicuous manner by periodically enlarging or reducing the face frame.

In addition, the display changing section 146 may make the display mode of the region image 222 different according to the relative positional relation between the face of the user A and the region image 222 which relative positional relation is derived by the relative position deriving section 150. For example, the display changing section 146 may instruct the region image display section 128 to change the color of the region image 222 so as to display the region image 222 in blue when the face of the user A is distant from the region image 222, and display the region image 222 in red when the face of the user A has approached the region image 222 to a predetermined distance or less.

Description will be made of a case of changing the size of the face frame as one of changing modes.

As already described, FIG. 8 depicts a method of creating a face frame in the normal mode. When the region image display section 128 receives an instruction to enlarge the region image 222 from the display changing section 146, the region image display section 128 may enlarge the region image 222 as follows. In the normal mode, the region image display section 128 sets the enlarged region 220*b* by enlarging the detection region 220*a* vertically and horizontally. However, the region image display section 128 may change each of the enlargement ratio SFa in the vertical direction and the enlargement ratio SFb in the horizontal direction to an even higher enlargement ratio. After setting the larger enlarged region, the region image display section 128 sets a horizontal movement region and a rotated region as already described, and thereby creates the region image 222 as a face frame.

Figure 10:
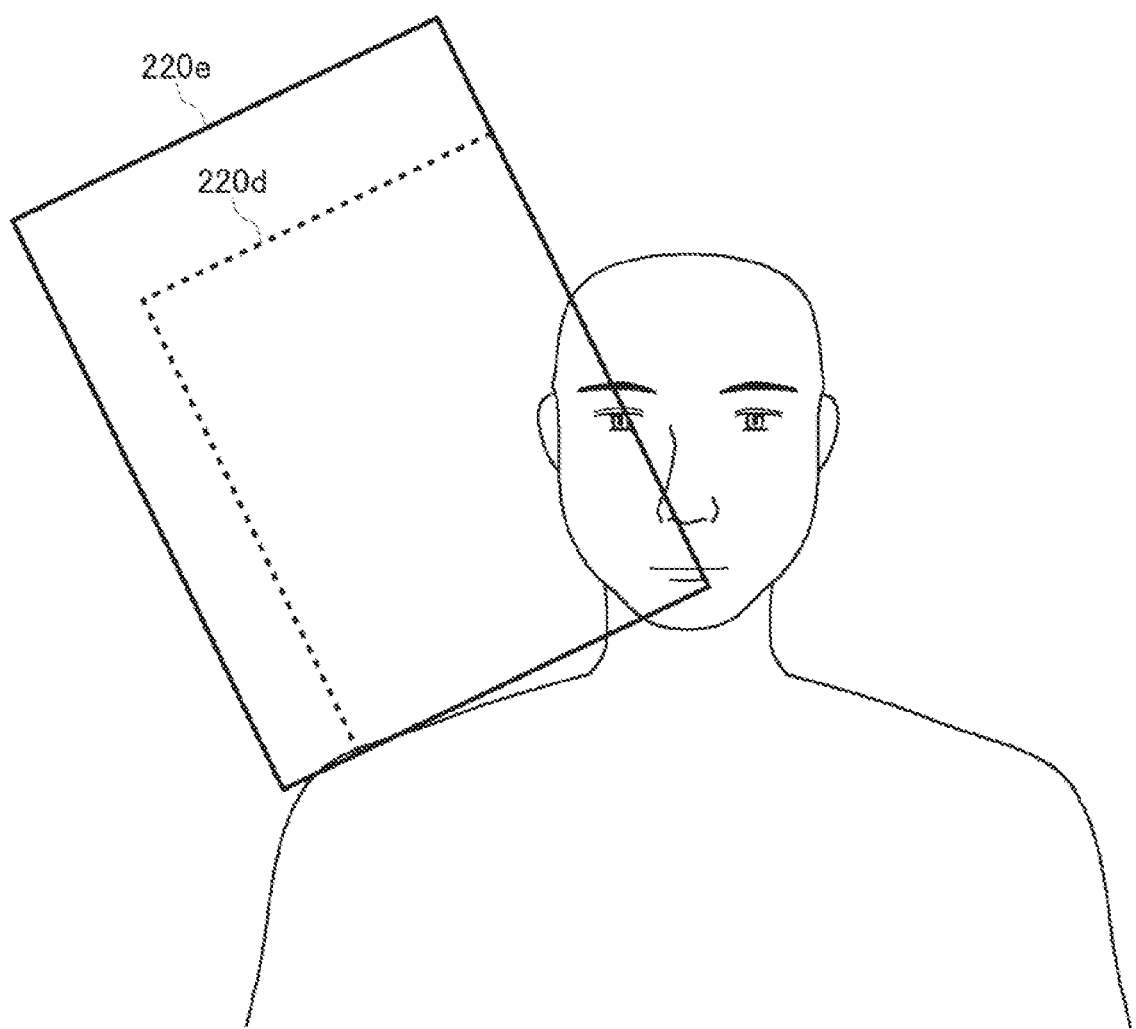
FIG. 10 is a diagram depicting a rotated region obtained by enlarging a rotated region depicted in FIG. 8.

FIG. 10 depicts a rotated region 220*e* obtained by enlarging the rotated region 220*d* depicted in FIG. 8. In the login assistance mode, the region image display section 128 applies a predetermined color to the outer frame of the rotated region 220*e*, and creates the region image 222 as a face frame. The region image display section 128 can change the rotated region 220*e* by increasing the enlargement ratios of the detection region 220*a* in the method of creating the face frame as described with reference to FIG. 8. The region image display section 128 can thus create an enlarged region image 222.

Incidentally, the region image display section 128 may create the region image 222 in the login assistance mode by simply enlarging the region image 222 in the normal mode. When the region image 222 in the normal mode is to be enlarged, it is desirable that the region image display section 128 not enlarge the region image 222 in a direction in which the face of the user is present. The face authenticating section 126 sets a rectangular region including at least the region specified by the region image 222 as the comparison region 224 for comparison with the face identifying data (see FIG. 7B). Thus, when the region image 222 is enlarged in the direction in which the face is present, the face image may be detected within the comparison region 224 even though the user is not moving the face, and the face authenticating section 126 may perform face authentication. The embodiment provides an environment that makes it easy for the user A as an assistance desiring user to log in. However, it is not desirable to log in the user even when the user does not have the intention to log in. Accordingly, when the face frame is to be enlarged, a situation in which the user unexpectedly logs in is avoided by enlarging the face frame in the direction in which the face of the user is not present.

It is desirable that the display mode of the region image 222 be thus changed in the login assistance mode. In addition to this, the login processing section 160 desirably displays the user name (HANAKO) in a display mode different from the normal mode. For example, the login processing section 160 may make the size, thickness, color, font, or the like of the characters different than in the normal mode, or may display the characters in a conspicuous mode by blinking the characters themselves or enlarging and reducing the characters. This makes it easy for the user A to recognize the user name of the user A.

Incidentally, in the login processing 3, the user authentication in the first stage (face authentication) is performed regardless of the intention of the user. Even when the user A is detected, it is not clear whether the user A has the intention to log in. Therefore, the assistance processing by the voice guiding section 144 and the display changing section 146 may be performed with a predetermined number of times or a predetermined time as an upper limit. The assistance by the voice guiding section 144 in particular is voice guidance reading out a notifying message. Thus, when the user A does not have the intention to log in, repeated voice guidance can be annoying. It is accordingly desirable that the voice guiding section 144 set an upper limit number of times of notifying for example the message "HANAKO-san is detected. When HANAKO-san desires to log in, please put the face in the face frame.", and ends the notification of the message when the number of times of notifying the message reaches the upper limit number of times. Incidentally, an upper limit may be set to the number of times of notifying the message, and an upper limit may be set to a message notification time. At this time, the changed state of the display mode of the region image 222 may be ended at the same time as an end of the notification of the message.

In the example depicted in FIGS. 9A and 9B, the user A (HANAKO) is an assistance desiring user, and the user B (SACHIKO) is an ordinary user. Therefore, the voice guiding section 144 does not perform voice guidance for the user B, and the display changing section 146 does not instruct the region image display section 128 to change the region image 222b for the user B.

However, on the login screen depicted in FIGS. 9A and 9B, the user B can log in when putting the face in the region image 222b. In a case where there is for example a constraint in the information processing device 10 such that only a user that first puts the face in the face frame can log in by the login processing 3, it is difficult for the user A to log in by the login processing 3 when the user B has logged in by putting the face in the face frame. When this is considered from a viewpoint of login assistance for an assistance desiring user, because an assistance desiring user having poor eyesight has difficulty in login operation, it is desirable to make a design so as to allow the assistance desiring user to log in preferentially.

Figure 11A:
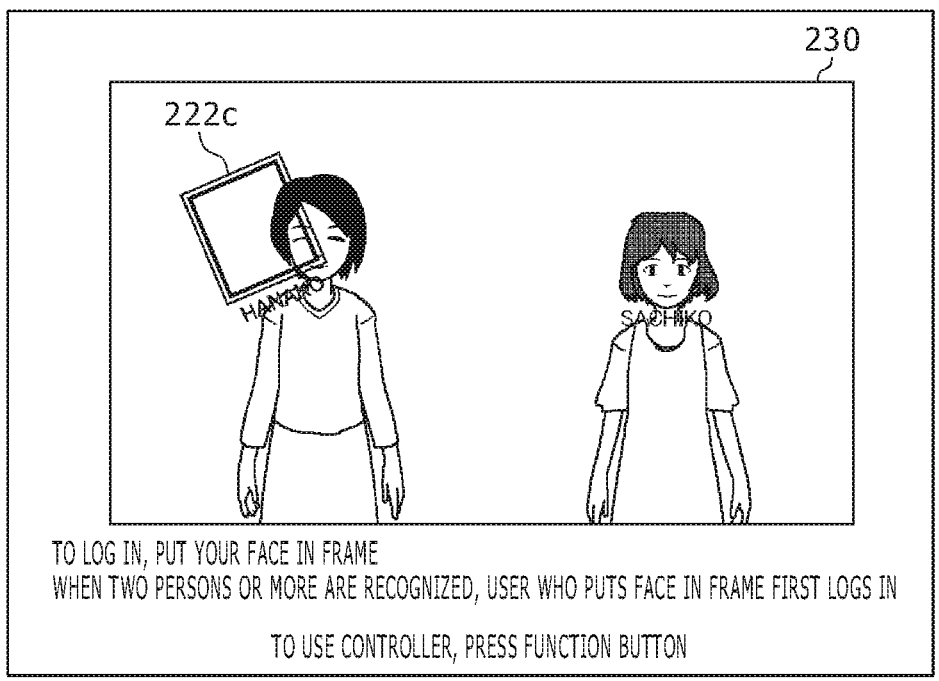
FIGS. 11A and 11B are diagrams depicting examples of login control for a user B.
Figure 11B:
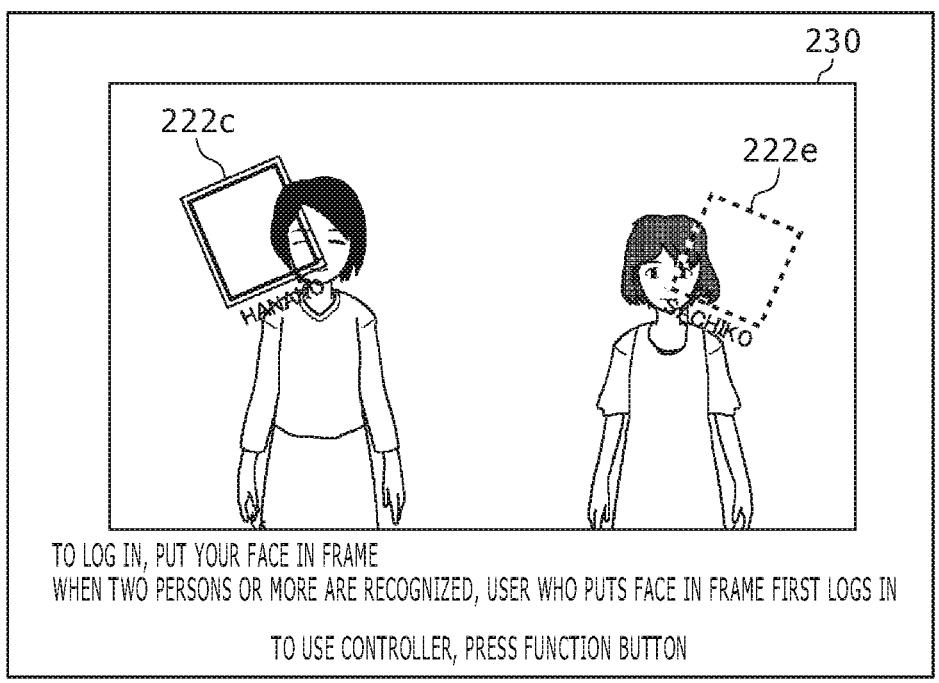

FIGS. 11A and 11B are diagrams depicting examples of login control for the user B as an ordinary user.

FIG. 11A depicts an example in which the region image 222b for the user B is set in a non-display state. The display changing section 146 sets the region image 222b in a non-display state so that it is difficult for the user B to log in while displaying the region image 222c different than in the normal mode for the user A as an assistance desiring user. At this time, it is difficult for the user B to log in because there is no face frame in which to put the face.

FIG. 11B depicts an example in which a region image 222e for the user B is displayed by a dotted line. The display changing section 146 displays the region image 222e different than in the normal mode so that it is difficult for the user B to log in while displaying the region image 222c for the user A. Because the display mode of the region image 222e is different than in the normal mode, the user B can recognize that login assistance for the user A is being provided. Incidentally, the region image 222e is not limited to being displayed by the dotted line, but may be displayed in a pale color, or displayed in a mode making it difficult for the user B to see the region image 222e, to hinder the login operation of the user B.

Incidentally, the recognition condition setting section 148 may change a threshold value used for the user authentication of an ordinary user in the login assistance mode such that the threshold value is higher than in the normal mode. For example, supposing that the threshold value of authentication of the user in the normal mode is a score of 90, the recognition condition setting section 148 changes the threshold value for an ordinary user to a score of 95. Thereby the login operation of the user B may be hindered.

Incidentally, as described above, a predetermined upper limit number of times or a predetermined upper limit time is set to the login assistance processing for the user A, and the assistance processing is not performed beyond the upper limit. Therefore, when the login assistance processing for the user A is ended, the region image 222b in the normal mode is displayed for the user B.

Incidentally, the user B may forcibly end the login assistance processing. The user B can end the login assistance processing by performing a predetermined utterance. For example, when the user B utters "please end the login assistance," the voice received by the microphone 108 is supplied to the input receiving section 104. The input receiving section 104 analyzes the utterance by a voice recognizing function, and receives the utterance as an instruction to end the guidance for the assistance desiring user. Thus, the guidance execution determining section 132 forcibly stops the function of the guidance control section 140, and the login assistance is ended. Incidentally, this utterance may be performed by the user A. In addition, the users A and B may perform input for forcibly terminating the login assistance by another section, and the input receiving section 104 may receive the input.

The user A may clearly have no intention to log in when the users A and B are present in front of the camera 7. In that case, it is desirable that the user A or B forcibly terminate the login assistance by performing the predetermined utterance. When the login assistance is not forcibly terminated, the login assistance processing for the user A is performed within the range of the predetermined upper limit number of times or the predetermined upper limit time, and therefore the user B has to wait during the login assistance processing for the user A even when the user B has the intention to log in. Accordingly, when the user B knows that the user A has no intention to log in, the user B can log in immediately by forcibly terminating the login assistance processing.

An example has been depicted above in which the user A is an assistance desiring user and the user B is an ordinary user. Description in the following will be made of an example in which the users A and B are both an assistance desiring user.

When a plurality of users are assistance desiring users, the voice guiding section 144 and the display changing section 146 may perform guiding assistance for each of the users in order. For example, guiding assistance is first performed for the user A, and guiding assistance is next performed for the user B. This guidance is performed with a predetermined upper limit number of times or a predetermined upper limit time as a limit. After the guidance is performed for each of the users, the guiding assistance for the assistance desiring users is ended. Incidentally, the upper limit number of times or the upper limit time may be set for each of the users, and may be registered as the attribute information of the users in the registered user information retaining section 180, for example.

Incidentally, when a plurality of users are assistance desiring users, order in which the login assistance processing is performed may be determined according to a predetermined order of priority. For example, the priority of a user who has logged in recently may be set high, the priority of a user whose face image included in the imaged image display region 230 is large may be set high, or the priority of a user who logs in with a high frequency may be set high.

The above description has been made of the creation of an environment that makes it easy for the user to log in by voice guidance and the highlighting of the face frame. The following description will be made of the creation of an environment that makes it easy for the user to log in by controlling a face authentication condition.

Figure 12:
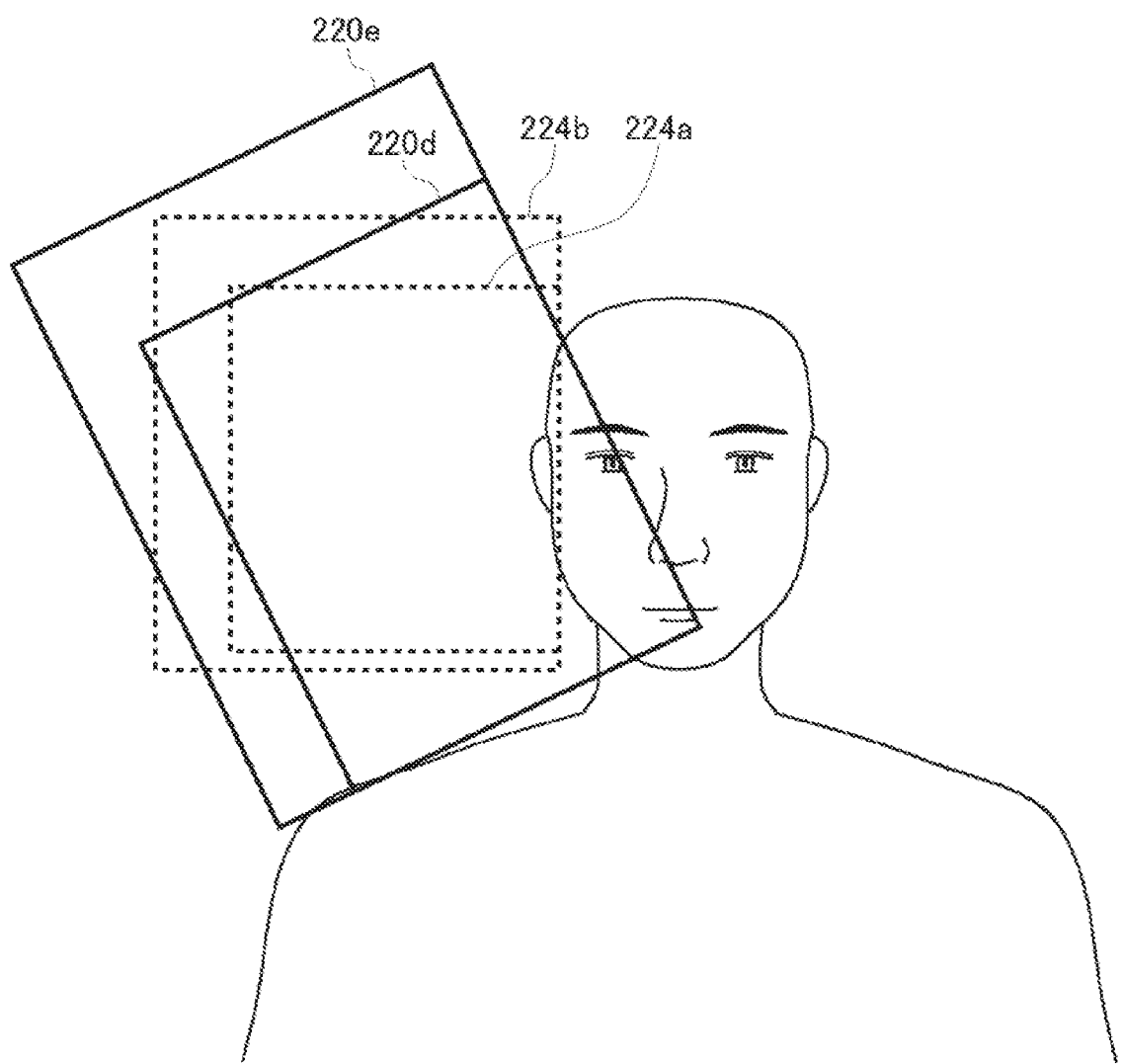
FIG. 12 is a diagram depicting an example of a comparison region for comparison by a face authenticating section.

FIG. 12 depicts an example of comparison regions 224 for comparison by the face authenticating section 126. In the embodiment, the region in which the face authenticating section 126 identifies a face image is set using the Feret diameters of the region image 222 displayed by the region image display section 128. The recognition condition setting section 148 reduces a rectangular region defined by the horizontal Feret diameter and the vertical Feret diameter of the region image 222 in the login assistance mode, sets the reduced rectangular region as a comparison region 224b for identifying a face image, and notifies the position coordinates of the comparison region 224b to the face authenticating section 126.

A comparison region 224a represents a region defined by the rotated region 220d (see FIG. 8) in the normal mode. The comparison region 224b represents a region defined by the rotated region 220e (see FIG. 10) in the login assistance mode. As depicted in the figure, the comparison region 224b in the login assistance mode is set larger than the comparison region 224a in the normal mode. The comparison region 224 is thus set larger in the login assistance mode. Therefore, a range in which the face of the user is identified is expanded, thus facilitating login.

Incidentally, it is desirable to expand the comparison region 224b in a direction of going away from the face with respect to the comparison region 224a. This avoids a situation in which the face is included in the comparison region 224b and therefore the user is logged in even though the user does not have the intention to log in, as described above.

Incidentally, the present example assumes that the region image 222 as a face frame is expanded in the login assistance mode. However, only the comparison region 224 may be expanded without the face frame being expanded. Also in this case, the comparison region 224b is desirably expanded in the direction of going away from the face with respect to the comparison region 224a in the normal mode.

The face authenticating section 126 derives degrees of coincidence between the feature quantity data of the face image of the user which face image is extracted from the comparison region 224 and the face identifying data of the registered users which face identifying data is read from the registered user information retaining section 180. The recognition condition setting section 148 may change the threshold value used for user authentication in the login assistance mode such that the threshold value is lower than in the normal mode. For example, supposing that the threshold value of authentication of the user in the normal mode is a score of 90, the recognition condition setting section 148 changes the threshold value in the login assistance mode to a score of 70. At a time of face authentication, it is desirable that the user make the face squarely face the camera 7. However, an assistance desiring user may not be able to orient the face properly within the face frame. In such a case, evaluated scores of the degrees of coincidence are decreased. In order to remedy such a case, the recognition condition setting section 148 desirably sets the authentication threshold value lower than in the normal mode.

In addition, when the face authenticating section 126 derives the degrees of coincidence between the feature quantity data of the face image of the user and the face identifying data, the face authenticating section 126 may not use the feature quantity data of part of the face in deriving the degrees of coincidence. A person having poor eyesight tends to narrow the eyes when trying to see an object. Regions around the eyes and eyebrows, in particular, in a face image imaged in such a state are expected to be different from the face identifying data at a time of registration. Therefore, the face authenticating section 126 may not use, for face authentication, feature quantity data of positions corresponding to the parts of the eyes and the eyebrows which feature quantity data is included in the feature quantity data of the face image of the user, and may derive degrees of coincidence between the other feature quantities and the face identifying data. This condition is notified to the face authenticating section 126 by the recognition condition setting section 148. For example, the feature quantity data to be ignored may be input by the user, and may be notified to the face authenticating section 126 by the recognition condition setting section 148.

The present technology has been described above on the basis of an embodiment thereof. The present embodiment is illustrative, and it is to be understood by those skilled in the art that combinations of constituent elements and processing processes of the embodiment are susceptible of various modifications, and that such modifications also fall within the scope of the present technology. In the embodiment, voice guidance, the highlighting of the region image 222, the enlargement of the comparison region 224, the changing of the face authentication threshold value, or the like has been described as login assistance processing. However, these pieces of login assistance processing may be performed in arbitrary combination.

In the embodiment, login assistance in the login processing 3 has been described. However, login assistance can be similarly performed also in the login processing 2. In particular, the display changing section 146 may make the display mode of the region image 212 differ between the normal mode and the login assistance mode. In the login assistance mode, the region image 212 may be highlighted to make it easy for the assistance desiring user to move the input device 6 into the region image 212. In addition, the voice guiding section 144 may guide the login operation of the user by voice guidance as in the login processing 3.

In addition, in the embodiment, the recognition condition setting section 148 sets the recognition condition looser than in the normal mode so as to make it easy for an assistance desiring user to log in. Besides, it is also necessary to avoid a situation in which an assistance desiring user having no intention to log in is logged in unexpectedly. Therefore, for example, the recognition condition may be set loose during a first half of a period during which the login assistance processing is performed within the range of the upper limit number of times or the upper limit time, and the recognition condition may be conversely set strict during a second half of the period. This is because it can be considered that the assistance desiring user is expected to perform login operation to log in in the first half (in early timing) when the assistance desiring user has the intention to log in, whereas there is a small possibility of the assistance desiring user performing login operation in timing in the second half when the assistance desiring user does not have the intention to log in. It is thereby possible to avoid a situation in which the assistance desiring user accidentally logs in.

Incidentally, for an assistance desiring user, the guidance control section 140 may present guiding assistance on a mobile terminal of the user. An access destination (an address, a telephone number, or the like) of the mobile terminal of the user is registered in the registered user information retaining section 180 in association with the user account. In the login assistance mode, the guidance control section 140 reads the access destination, and accesses the mobile terminal.

For example, the voice guiding section 144 may transmit audio data saying "HANAKO-san is detected. When HANAKO-san desires to log in, please put the face in the face frame." to the mobile terminal of the user A. At this time, the relative position deriving section 150 may derive relative positional relation between the face frame and the face of the user A, and the voice guiding section 144 may guide the user A to put the face in the face frame by voice. For example, the voice guiding section 144 may perform voice guidance such as "please incline to the right a little more" or the like according to a distance between the face frame and the face. In a case of noisy surroundings, in particular, it is expected that sound from the output device 4 may not be heard. Thus, outputting the sound from the mobile terminal at a high volume allows the user A to hear the sound easily.

In addition, the login processing section 160 may transmit, to the mobile terminal, image data or text data for representing a direction in which to move the face by an arrow, characters, or the like on a display screen of the mobile terminal. The mobile terminal displays the image data or the text data on the screen. The user A can view the screen display of the mobile terminal at a position closer than the output device 4. Thus, even if the user A has poor eyesight, the user A can perform login operation suitably. In addition, the login processing section 160 may transmit, to the mobile terminal, the image data depicted in the imaged image display region 206 in the login processing 2 or the imaged image display region 230 in the login processing 3. This enables the user to recognize in which direction the user should move the input device 6 or the face.

In addition, in the login processing 3, the user face authentication in the second stage may be also performed on the mobile terminal side. As described above, the information processing device 10 performs the user face authentication in the first stage. Thus, when the face authentication in the second stage is performed on the mobile terminal, the login operation of putting the face in the face frame displayed on the output device 4 can be omitted. Incidentally, though it is assumed that the mobile terminal has a camera and has a user authenticating function, the accuracy of the user authentication can be maintained by allowing login when the user authentication has succeeded in both of the information processing device 10 and the mobile terminal. Incidentally, in the embodiment, description has been made of lowering the threshold value for degrees of coincidence in the face authentication in the login assistance mode. When both of the information processing device 10 and the mobile terminal perform face authentication, the threshold value in each of the information processing device 10 and the mobile terminal may be set low. A result of face recognition in the mobile terminal is transmitted to the information processing device 10. The login processing section 160 logs in the user A on the basis of a fact that the face authentication of the user A has been performed in the mobile terminal.

Incidentally, when the mobile terminal performs the user authentication in the second stage in the login processing 3, the mobile terminal may not only perform the face authentication but also perform user authentication such as password authentication, pupil recognition, or the like. The accuracy of user authentication can be improved by thus performing the user authentication in a composite manner by a plurality of terminal devices.

In addition, when the user authentication in the second stage has not succeeded despite assistance in the login assistance mode in the login processing 2 or the login processing 3, the login processing section 160 may switch to the login processing 1. In addition, in this case, other login processing, for example login processing based on voice recognition or the like may be performed.

In the embodiment, description has been made of a case where the region image display section 128 displays, on the display, a region image specifying a region to which to move the face of a person or the input device 6. The region image display section 128 may display a region image specifying a region to which to move an object other than the face or the input device 6. For example, the object to be moved may be a body part other than the face of a person, for example a hand or a foot, or a predetermined object, for example a code identifier such as a bar code or the like. The region image display section 128 displays a region image specifying a region to which to move an object desired for login.

The present disclosure contains subject matter related to that disclosed in Japanese Priority Patent Application JP 2015-217876 filed in the Japan Patent Office on Nov. 5, 2016, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
    an imaged image display section configured to display an imaged image on a display,
      wherein the imaged image is captured by a camera of the information processing device;
    a registered user information retaining section configured to retain face identifying data of a registered user;
    a face authenticating section configured to detect
      (a) a face image of the registered user present in the imaged image using the face identifying data retained in the registered user information retaining section, and
      (b) an object held by the user present in the imaged image;
    a region image display section configured to display, to the detected registered user, a face frame surrounding the face image of the registered user and a region image specifying a region to which to move the object in the imaged image displayed on the display;
    a guidance control section configured to:
    provide a first login processing to the detected registered user when first attribute information is associated with the detected registered user;
    provide a second login processing to the detected registered user when second attribute information is associated with the detected registered user,
      wherein the second login processing provides audio guiding assistance to the detected registered user for facilitating the detected registered user moving the object to the region specified by the region image in the imaged image, and
      wherein the object is an input device held by the user;
    an object authenticating section to authenticate the object moved to the region image; and
    a login processing section to log in the registered user.

2. The information processing device according to claim 1, wherein the region image is displayed at a first size during the second login processing and at a second size in the first login processing, wherein the first size is greater than the second size.

3. The information processing device according to claim 2, wherein
    the guidance control section performs audio output of a user name of the detected registered user during the second login processing.

4. A login control method comprising:
    displaying an imaged image on a display;
    detecting a face image of a registered user present in the imaged image using face identifying data of the registered user, the face identifying data being retained in a registered user information retaining section;

detecting an object held by the user present in the imaged image, wherein the object is an input device;

simultaneously displaying, to the detected registered user, a face frame surrounding the face image of the registered user and a region image specifying a region to which to move the object in the imaged image on the display;

determining, for the detected registered user, whether the detected registered user is associated with a first attribute or a second attribute;

providing a first login processing to the detected registered user when the first attribute is associated with detected registered user;

providing a second login processing, different than the first login processing, when the second attribute is associated with the detected registered user, wherein the second login processing provides audio guiding assistance to the detected registered user for facilitating the detected registered user moving the object to the region specified by the region image;

authenticating the object moved to the region image; and logging in the registered user.

5. A non-transitory computer readable medium having stored thereon a program for a computer, the program comprising:

by an imaged image display section, displaying an imaged image on a display;

by a face authenticating section, detecting a face image of a registered user present in the imaged image using face identifying data of the registered user, the face identifying data being retained in a registered user information retaining section, and detecting an object held by the user present in the imaged image, wherein the object is an input device;

by a region image display section, displaying, to the detected registered user, a face frame surrounding the face image of the registered user and a region image specifying a region to which to move the object in the imaged image displayed on the display;

determining, for the detected registered user, whether the detected registered user is associated with a first attribute or a second attribute;

providing a first login processing to the detected registered user if when the first attribute is associated with detected registered user;

providing a second login processing, different than the first login processing, if when the second attribute is associated with the detected registered user, wherein the second login processing provides audio guiding assistance to the detected registered for facilitating the detected registered user moving the object to the region specified by the region image in the imaged image;

by an object authenticating section, authenticating the object moved to the region image; and by a login processing section, logging in the registered user.

* * * * *